United States Patent
Blum et al.

(10) Patent No.: US 9,628,707 B2
(45) Date of Patent: Apr. 18, 2017

(54) WIRELESS CAMERA SYSTEMS AND METHODS

(71) Applicant: PogoTec, Inc., Roanoke, VA (US)

(72) Inventors: Ronald D. Blum, Roanoke, VA (US); Amitava Gupta, Roanoke, VA (US); William Kokonaski, Gig Harbor, WA (US); Richard Clompus, Trinidad, CA (US); Massimo Pinazza, Domegge di Cadore (IT); Claudio Dalla Longa, Valdobbiadene (IT); Stefan Bauer, Bern (CH); Jean-Noel Fehr, Neuchatel (CH); Walter Dannhardt, Roanoke, VA (US)

(73) Assignee: PogoTec, Inc., Roanoke, VA (US)

( * ) Notice: Subject to any disclaimer, the term of this patent is extended or adjusted under 35 U.S.C. 154(b) by 0 days.

(21) Appl. No.: 14/757,753

(22) Filed: Dec. 23, 2015

(65) Prior Publication Data
US 2016/0182826 A1    Jun. 23, 2016

Related U.S. Application Data

(60) Provisional application No. 62/095,920, filed on Dec. 23, 2014, provisional application No. 62/104,418, (Continued)

(51) Int. Cl.
*H04N 5/225*    (2006.01)
*H04N 5/232*    (2006.01)
(Continued)

(52) U.S. Cl.
CPC ......... *H04N 5/23241* (2013.01); *H02J 7/025* (2013.01); *H02J 50/12* (2016.02);
(Continued)

(58) Field of Classification Search
None
See application file for complete search history.

(56) References Cited

U.S. PATENT DOCUMENTS 3,476,467 A    11/1969    Curry
3,593,449 A     7/1971    Nielson
(Continued)

FOREIGN PATENT DOCUMENTS

CN    201318005        9/2009
CN    202033546 U     11/2011
(Continued)

OTHER PUBLICATIONS

International Search Report and Written Opinion received for PCT/US2015/00205 mailed Jun. 9, 2016.
(Continued)

*Primary Examiner* — Roberto Velez
*Assistant Examiner* — Stephen Coleman
(74) *Attorney, Agent, or Firm* — Dorsey & Whitney LLP

(57) ABSTRACT

Camera systems and methods configured to receive power wirelessly are described. A wireless energy transfer system according to some examples includes a transmitter of wireless energy located within a communication device, such as a mobile phone, or attached to the communication device and a distance separated receiver located within an electronic wearable device other than the communication device, such as a wearable camera.

49 Claims, 14 Drawing Sheets

Related U.S. Application Data filed on Jan. 16, 2015, provisional application No. 62/113,573, filed on Feb. 9, 2015, provisional application No. 62/116,648, filed on Feb. 16, 2015, provisional application No. 62/127,622, filed on Mar. 3, 2015, provisional application No. 62/128,362, filed on Mar. 4, 2015, provisional application No. 62/153,999, filed on Apr. 28, 2015, provisional application No. 62/154,019, filed on Apr. 28, 2015, provisional application No. 62/167,739, filed on May 28, 2015, provisional application No. 62/173,788, filed on Jun. 10, 2015, provisional application No. 62/108,199, filed on Jun. 16, 2015, provisional application No. 62/186,341, filed on Jun. 29, 2015, provisional application No. 62/189,916, filed on Jul. 8, 2015.

(51) Int. Cl.
*H02J 7/02* (2016.01)
*H02J 50/12* (2016.01)
*H02J 50/80* (2016.01)
*H02J 50/40* (2016.01)
*H04N 5/38* (2006.01)

(52) U.S. Cl.
CPC ........... *H02J 50/80* (2016.02); *H04N 5/2252* (2013.01); *H04N 5/23206* (2013.01); *H02J 50/40* (2016.02); *H04N 5/38* (2013.01)

(56) References Cited

U.S. PATENT DOCUMENTS

| | | |
|---|---|---|
| 3,780,918 A | 12/1973 | Curtis |
| 4,379,988 A | 4/1983 | Mattatall |
| 4,405,213 A | 9/1983 | Kolkmann |
| 4,457,461 A | 7/1984 | Docking et al. |
| 4,506,961 A | 3/1985 | Palmieri |
| 4,516,157 A | 5/1985 | Campbell |
| 4,781,315 A | 11/1988 | Nordskog |
| 4,816,031 A | 3/1989 | Pfoff |
| 4,845,755 A | 7/1989 | Busch et al. |
| 4,918,737 A | 4/1990 | Luethi |
| 5,181,051 A | 1/1993 | Townsend et al. |
| 5,416,537 A | 5/1995 | Sadler |
| 5,568,207 A | 10/1996 | Chao |
| 5,606,743 A | 2/1997 | Vogt et al. |
| 5,608,808 A | 3/1997 | Da Silva |
| 5,623,703 A | 4/1997 | Takagi et al. |
| 5,636,775 A | 6/1997 | Kartsotis et al. |
| 5,786,789 A | 7/1998 | Janky |
| 5,913,815 A | 6/1999 | Ball et al. |
| 5,915,588 A | 6/1999 | Stoken et al. |
| 6,028,413 A | 2/2000 | Brockmann |
| 6,076,927 A | 6/2000 | Owens |
| 6,091,546 A | 7/2000 | Spitzer |
| 6,157,291 A | 12/2000 | Kuenster et al. |
| 6,215,460 B1 | 4/2001 | Mizoguchi et al. |
| 6,275,681 B1 | 8/2001 | Vega et al. |
| 6,735,897 B1 | 5/2004 | Schmitter |
| 6,783,238 B1 | 8/2004 | Stepper |
| 6,977,479 B2 | 12/2005 | Hsu |
| 7,003,353 B1 | 2/2006 | Parkhouse |
| 7,092,763 B1 | 8/2006 | Griffith et al. |
| 7,126,558 B1 | 10/2006 | Dempski |
| 7,158,096 B1 | 1/2007 | Spitzer |
| 7,203,134 B1 | 4/2007 | Jackson |
| 7,229,168 B2 | 6/2007 | Kidouchim |
| 7,236,356 B2 | 6/2007 | Ulla et al. |
| 7,320,514 B2 | 1/2008 | Smith |
| 7,409,234 B2 | 8/2008 | Glezerman |
| 7,435,019 B2 | 10/2008 | Lee |
| 7,597,440 B1 | 10/2009 | Magal |
| 7,618,260 B2 | 11/2009 | Daniel et al. |
| 7,684,868 B2 | 3/2010 | Tai et al. |
| 7,793,361 B2 | 9/2010 | Ishihara et al. |
| 7,937,880 B1 | 5/2011 | Fidlow |
| 7,979,963 B2 | 7/2011 | Lee-Holowka et al. |
| 7,988,283 B2 | 8/2011 | Jannard |
| 8,046,948 B2 | 11/2011 | Mauch et al. |
| 8,068,169 B2 | 11/2011 | Chang |
| D653,202 S | 1/2012 | Hasbrook et al. |
| 8,109,629 B2 | 2/2012 | Howell et al. |
| 8,111,042 B2 | 2/2012 | Bennett |
| 8,123,352 B2 | 2/2012 | Matsumoto et al. |
| D659,094 S | 5/2012 | Brand et al. |
| 8,175,660 B2 | 5/2012 | Porwal |
| 8,193,781 B2 | 6/2012 | Lin et al. |
| D666,144 S | 8/2012 | Brand et al. |
| 8,299,877 B2 | 10/2012 | Hong et al. |
| D670,703 S | 11/2012 | Hasbrook et al. |
| D671,493 S | 11/2012 | Hasbrook et al. |
| 8,334,620 B2 | 12/2012 | Park et al. |
| D675,625 S | 2/2013 | Hasbrook et al. |
| D676,432 S | 2/2013 | Hasbrook et al. |
| 8,367,235 B2 | 2/2013 | Huang |
| 8,378,524 B2 | 2/2013 | Mita |
| 8,401,595 B2 | 3/2013 | Zhu et al. |
| 8,432,129 B2 | 4/2013 | Lee et al. |
| 8,469,508 B2 | 6/2013 | Silver et al. |
| 8,473,004 B2 | 6/2013 | Warren |
| 8,493,287 B2 | 7/2013 | Yamamoto |
| 8,534,514 B2 | 9/2013 | Zhu et al. |
| 8,541,975 B2 | 9/2013 | Park et al. |
| 8,571,609 B2 | 10/2013 | Hwang et al. |
| 8,587,241 B2 | 11/2013 | Maeda |
| 8,653,909 B2 | 2/2014 | Park et al. |
| 8,716,899 B2 | 5/2014 | Yi et al. |
| 8,754,548 B2 | 6/2014 | Hong et al. |
| 8,778,022 B2 | 7/2014 | Blum et al. |
| 8,787,970 B2 | 7/2014 | Warren |
| 8,823,215 B2 | 9/2014 | Park et al. |
| 8,829,724 B2 | 9/2014 | Ryu et al. |
| 8,830,888 B2 | 9/2014 | Shin et al. |
| 8,842,635 B2 | 9/2014 | Kim et al. |
| 8,868,140 B2 | 10/2014 | Zhu et al. |
| 8,890,954 B2 | 11/2014 | O'Donnell et al. |
| 8,896,694 B2 | 11/2014 | O'Donnell et al. |
| 8,915,588 B2 | 12/2014 | Blum et al. |
| 8,922,161 B2 | 12/2014 | Choi et al. |
| 8,927,881 B2 | 1/2015 | Wittenberg et al. |
| 8,929,245 B2 | 1/2015 | Sivanesan et al. |
| 8,931,896 B2 | 1/2015 | Blum et al. |
| 8,934,045 B2 | 1/2015 | Karn et al. |
| 8,957,629 B2 | 2/2015 | Ryu et al. |
| 8,971,039 B2 | 3/2015 | Huang et al. |
| 8,987,942 B2 | 3/2015 | Kim et al. |
| D726,140 S | 4/2015 | Park et al. |
| D729,650 S | 5/2015 | Phillips et al. |
| 9,024,484 B2 | 5/2015 | Park et al. |
| 9,026,165 B2 | 5/2015 | Kim et al. |
| 9,030,052 B2 | 5/2015 | Kim et al. |
| 9,048,682 B2 | 6/2015 | Lee et al. |
| 9,048,683 B2 | 6/2015 | Lee et al. |
| 9,048,695 B2 | 6/2015 | Hwang et al. |
| 9,065,488 B2 | 6/2015 | Kim et al. |
| 9,075,249 B2 | 7/2015 | Heinrich et al. |
| 9,088,167 B2 | 7/2015 | Kim et al. |
| 9,088,171 B2 | 7/2015 | Won et al. |
| 9,122,083 B2 | 9/2015 | Blum et al. |
| 9,152,130 B2 | 10/2015 | Pattikonda et al. |
| D742,372 S | 11/2015 | Christopher et al. |
| D755,787 S | 5/2016 | Zander et al. |
| 9,380,374 B2 | 6/2016 | Sprague et al. |
| D766,770 S | 9/2016 | Devaney et al. |
| 2004/0080299 A1 | 4/2004 | Forster et al. |
| 2004/0088051 A1 | 5/2004 | Seligman |
| 2005/0046786 A1 | 3/2005 | Smith |
| 2005/0083579 A1 | 4/2005 | Volkenandt et al. |
| 2005/0088811 A1 | 4/2005 | Ulla et al. |
| 2005/0167558 A1* | 8/2005 | Smith .................... F16M 11/06 248/317 |
| 2005/0248717 A1 | 11/2005 | Howell et al. |
| 2006/0004546 A1 | 1/2006 | Slanec |

(56) References Cited

U.S. PATENT DOCUMENTS

| | | |
|---|---|---|
| 2006/0034478 A1 | 2/2006 | Davenport |
| 2006/0082730 A1 | 4/2006 | Franks |
| 2006/0095128 A1 | 5/2006 | Blum et al. |
| 2006/0121639 A1 | 6/2006 | Tai et al. |
| 2006/0268217 A1 | 11/2006 | Teng |
| 2007/0009253 A1 | 1/2007 | Nikkanen et al. |
| 2007/0013864 A1 | 1/2007 | Dietz |
| 2007/0023496 A1 | 2/2007 | Hall |
| 2007/0030442 A1 | 2/2007 | Howell et al. |
| 2007/0153639 A1 | 7/2007 | Lafever et al. |
| 2008/0034637 A1 | 2/2008 | Summers |
| 2008/0088791 A1 | 4/2008 | Smith |
| 2008/0116847 A1 | 5/2008 | Loke et al. |
| 2008/0163536 A1 | 7/2008 | Koch et al. |
| 2008/0180537 A1 | 7/2008 | Weinberg et al. |
| 2008/0208335 A1 | 8/2008 | Blum et al. |
| 2008/0231721 A1 | 9/2008 | Chou et al. |
| 2008/0259269 A1 | 10/2008 | Grogan et al. |
| 2008/0301846 A1 | 12/2008 | Brillouet |
| 2009/0009410 A1* | 1/2009 | Dolgin ............... G01C 21/165 343/703 |
| 2009/0040308 A1 | 2/2009 | Temovskiy |
| 2009/0110386 A1 | 4/2009 | Kamada et al. |
| 2009/0173760 A1 | 7/2009 | Good |
| 2009/0207701 A1 | 8/2009 | Jacques |
| 2009/0243397 A1 | 10/2009 | Cook et al. |
| 2009/0251661 A1 | 10/2009 | Fuziak, Jr. |
| 2009/0264966 A1 | 10/2009 | Blum et al. |
| 2010/0036773 A1 | 2/2010 | Bennett |
| 2010/0045114 A1 | 2/2010 | Sample et al. |
| 2010/0053555 A1 | 3/2010 | Enriquez et al. |
| 2010/0073262 A1 | 3/2010 | Matsumoto |
| 2010/0103076 A1 | 4/2010 | Yamamoto |
| 2010/0157432 A1 | 6/2010 | Sugihara et al. |
| 2010/0164295 A1 | 7/2010 | Ichikawa et al. |
| 2010/0174629 A1 | 7/2010 | Taylor et al. |
| 2010/0177476 A1 | 7/2010 | Hotelling et al. |
| 2010/0187910 A1 | 7/2010 | Brengauz |
| 2010/0245757 A1 | 9/2010 | Sugihara et al. |
| 2010/0284683 A1 | 11/2010 | Fressola et al. |
| 2010/0319096 A1 | 12/2010 | Scott et al. |
| 2011/0115429 A1 | 5/2011 | Toivola et al. |
| 2011/0156639 A1 | 6/2011 | Ryu et al. |
| 2011/0184320 A1 | 7/2011 | Shipps et al. |
| 2011/0185538 A1 | 8/2011 | Hotellier et al. |
| 2011/0188677 A1 | 8/2011 | Rothkopf et al. |
| 2011/0193963 A1 | 8/2011 | Hess et al. |
| 2011/0221389 A1 | 9/2011 | Won et al. |
| 2011/0221390 A1 | 9/2011 | Won et al. |
| 2011/0222154 A1 | 9/2011 | Choi et al. |
| 2011/0225073 A1 | 9/2011 | Won et al. |
| 2011/0234012 A1 | 9/2011 | Yi et al. |
| 2011/0241438 A1 | 10/2011 | Kim et al. |
| 2011/0241612 A1 | 10/2011 | Ryu et al. |
| 2012/0062173 A1 | 3/2012 | Choi et al. |
| 2012/0075571 A1 | 3/2012 | Silver |
| 2012/0081658 A1 | 4/2012 | Sugihara et al. |
| 2012/0105740 A1 | 5/2012 | Jannard et al. |
| 2012/0127423 A1 | 5/2012 | Blum et al. |
| 2012/0153903 A1 | 6/2012 | Kim et al. |
| 2012/0164943 A1 | 6/2012 | Bennett |
| 2012/0169278 A1 | 7/2012 | Choi et al. |
| 2012/0193996 A1 | 8/2012 | Ryu et al. |
| 2012/0280575 A1 | 11/2012 | Kim et al. |
| 2012/0286581 A1 | 11/2012 | Ryu et al. |
| 2012/0286582 A1 | 11/2012 | Kim et al. |
| 2012/0286726 A1 | 11/2012 | Kim et al. |
| 2012/0293008 A1 | 11/2012 | Park et al. |
| 2012/0293009 A1 | 11/2012 | Kim et al. |
| 2012/0293010 A1 | 11/2012 | Lee et al. |
| 2012/0294478 A1 | 11/2012 | Publicover et al. |
| 2012/0299390 A1 | 11/2012 | Kim et al. |
| 2012/0300872 A1 | 11/2012 | Kim et al. |
| 2012/0306269 A1 | 12/2012 | Kim et al. |
| 2012/0306284 A1 | 12/2012 | Lee et al. |
| 2012/0309304 A1 | 12/2012 | Kim et al. |
| 2012/0309305 A1 | 12/2012 | Kim et al. |
| 2012/0309306 A1 | 12/2012 | Kim et al. |
| 2012/0309308 A1 | 12/2012 | Kim et al. |
| 2012/0313445 A1 | 12/2012 | Park et al. |
| 2012/0313447 A1 | 12/2012 | Park et al. |
| 2012/0328043 A1 | 12/2012 | Kwon et al. |
| 2012/0329405 A1* | 12/2012 | Lee .................... H02J 17/00 455/73 |
| 2013/0015813 A1 | 1/2013 | Kim et al. |
| 2013/0026847 A1 | 1/2013 | Kim et al. |
| 2013/0033117 A1 | 2/2013 | Kim et al. |
| 2013/0035034 A1 | 2/2013 | Kim et al. |
| 2013/0039395 A1* | 2/2013 | Norconk ............ H04B 5/0031 375/219 |
| 2013/0043734 A1 | 2/2013 | Stone et al. |
| 2013/0043737 A1 | 2/2013 | Yeo et al. |
| 2013/0049456 A1 | 2/2013 | Kim et al. |
| 2013/0049483 A1 | 2/2013 | Kim et al. |
| 2013/0057079 A1 | 3/2013 | Park et al. |
| 2013/0058379 A1 | 3/2013 | Kim et al. |
| 2013/0058380 A1 | 3/2013 | Kim et al. |
| 2013/0059533 A1 | 3/2013 | Kwon et al. |
| 2013/0062963 A1 | 3/2013 | Chernokalov et al. |
| 2013/0062964 A1 | 3/2013 | Chernokalov et al. |
| 2013/0062965 A1 | 3/2013 | Chernokalov et al. |
| 2013/0063082 A1 | 3/2013 | Lee et al. |
| 2013/0063083 A1 | 3/2013 | Park et al. |
| 2013/0063873 A1 | 3/2013 | Wodrich et al. |
| 2013/0082651 A1 | 4/2013 | Park et al. |
| 2013/0093255 A1 | 4/2013 | Jung et al. |
| 2013/0099588 A1 | 4/2013 | Yeo et al. |
| 2013/0099591 A1 | 4/2013 | Yeo et al. |
| 2013/0099732 A1 | 4/2013 | Lee et al. |
| 2013/0099733 A1 | 4/2013 | Park et al. |
| 2013/0099734 A1 | 4/2013 | Lee et al. |
| 2013/0101133 A1 | 4/2013 | Yoon et al. |
| 2013/0113296 A1 | 5/2013 | Ryu et al. |
| 2013/0113298 A1 | 5/2013 | Ryu et al. |
| 2013/0119780 A1 | 5/2013 | Kim et al. |
| 2013/0119929 A1 | 5/2013 | Partovi |
| 2013/0127410 A1 | 5/2013 | Park et al. |
| 2013/0130621 A1 | 5/2013 | Kim et al. |
| 2013/0134791 A1 | 5/2013 | Park et al. |
| 2013/0134927 A1 | 5/2013 | Park et al. |
| 2013/0147427 A1 | 6/2013 | Polu et al. |
| 2013/0154387 A1 | 6/2013 | Lee et al. |
| 2013/0154557 A1 | 6/2013 | Lee et al. |
| 2013/0154558 A1 | 6/2013 | Lee et al. |
| 2013/0162200 A1 | 6/2013 | Terry et al. |
| 2013/0176652 A1 | 7/2013 | Kim et al. |
| 2013/0176653 A1 | 7/2013 | Kim et al. |
| 2013/0181665 A1 | 7/2013 | Lee et al. |
| 2013/0187475 A1 | 7/2013 | Vendik et al. |
| 2013/0187598 A1 | 7/2013 | Park et al. |
| 2013/0200844 A1 | 8/2013 | Lee et al. |
| 2013/0207479 A1 | 8/2013 | Vendik et al. |
| 2013/0207851 A1 | 8/2013 | Dabov |
| 2013/0210378 A1 | 8/2013 | Zhu et al. |
| 2013/0214734 A1 | 8/2013 | Kang et al. |
| 2013/0214735 A1 | 8/2013 | Kang et al. |
| 2013/0215374 A1 | 8/2013 | Blum et al. |
| 2013/0216085 A1 | 8/2013 | Honeycutt |
| 2013/0221912 A1 | 8/2013 | Kang et al. |
| 2013/0221914 A1 | 8/2013 | Kim et al. |
| 2013/0221915 A1 | 8/2013 | Son et al. |
| 2013/0225082 A1 | 8/2013 | Kang et al. |
| 2013/0229614 A1 | 9/2013 | Marini et al. |
| 2013/0235332 A1 | 9/2013 | Blum et al. |
| 2013/0241308 A1 | 9/2013 | Bilbrey et al. |
| 2013/0249306 A1 | 9/2013 | Kim et al. |
| 2013/0250135 A1* | 9/2013 | Blum .................... A61F 2/16 348/211.99 |
| 2013/0264997 A1 | 10/2013 | Lee et al. |
| 2013/0270920 A1 | 10/2013 | Yoon et al. |
| 2013/0278072 A1 | 10/2013 | Yoon et al. |
| 2013/0278207 A1 | 10/2013 | Yoo |
| 2013/0282117 A1 | 10/2013 | Van Heugten et al. |
| 2013/0329183 A1 | 12/2013 | Blum et al. |

(56) References Cited

U.S. PATENT DOCUMENTS

| | | |
|---|---|---|
| 2014/0021796 A1 | 1/2014 | Song et al. |
| 2014/0022765 A1 | 1/2014 | Waters |
| 2014/0027521 A1 | 1/2014 | Pedicano et al. |
| 2014/0043580 A1 | 2/2014 | Steele |
| 2014/0044281 A1 | 2/2014 | Ganem et al. |
| 2014/0049211 A1 | 2/2014 | Park et al. |
| 2014/0058506 A1 | 2/2014 | Tai et al. |
| 2014/0062395 A1 | 3/2014 | Kwon |
| 2014/0070623 A1 | 3/2014 | Keeling et al. |
| 2014/0070624 A1 | 3/2014 | Kim et al. |
| 2014/0070625 A1 | 3/2014 | Kim et al. |
| 2014/0071644 A1 | 3/2014 | Yoon et al. |
| 2014/0077613 A1 | 3/2014 | Song et al. |
| 2014/0077614 A1 | 3/2014 | Park et al. |
| 2014/0084688 A1 | 3/2014 | Tzanidis et al. |
| 2014/0084858 A1 | 3/2014 | Kim et al. |
| 2014/0103873 A1 | 4/2014 | Partovi et al. |
| 2014/0111018 A1 | 4/2014 | Kwon et al. |
| 2014/0111153 A1 | 4/2014 | Kwon et al. |
| 2014/0113689 A1 | 4/2014 | Lee |
| 2014/0125278 A1 | 5/2014 | Kim et al. |
| 2014/0135592 A1 | 5/2014 | Ohnemus et al. |
| 2014/0139180 A1 | 5/2014 | Kim et al. |
| 2014/0139637 A1* | 5/2014 | Mistry ............... H04N 5/2252 348/46 |
| 2014/0146282 A1 | 5/2014 | Lu |
| 2014/0152116 A1 | 6/2014 | Kim et al. |
| 2014/0152516 A1 | 6/2014 | Kim et al. |
| 2014/0159654 A1 | 6/2014 | Lee et al. |
| 2014/0183967 A1 | 7/2014 | Ryu et al. |
| 2014/0191593 A1 | 7/2014 | Moh |
| 2014/0197785 A1 | 7/2014 | Lee et al. |
| 2014/0203657 A1 | 7/2014 | Song et al. |
| 2014/0232980 A1 | 8/2014 | Harms et al. |
| 2014/0239280 A1 | 8/2014 | Takada et al. |
| 2014/0241555 A1 | 8/2014 | Terlizzi |
| 2014/0252875 A1 | 9/2014 | Lee |
| 2014/0253028 A1 | 9/2014 | Lee et al. |
| 2014/0253322 A1 | 9/2014 | Chapin et al. |
| 2014/0265614 A1 | 9/2014 | Kim et al. |
| 2014/0265615 A1 | 9/2014 | Kim et al. |
| 2014/0266020 A1 | 9/2014 | van Lammeren et al. |
| 2014/0266988 A1 | 9/2014 | Fisher et al. |
| 2014/0267874 A1 | 9/2014 | Ratcliff et al. |
| 2014/0268017 A1 | 9/2014 | Sweis et al. |
| 2014/0285139 A1 | 9/2014 | Ahn et al. |
| 2014/0285141 A1 | 9/2014 | Lee et al. |
| 2014/0285142 A1 | 9/2014 | Lee et al. |
| 2014/0285416 A1 | 9/2014 | Priyantha et al. |
| 2014/0308987 A1 | 10/2014 | Wilson et al. |
| 2014/0312834 A1 | 10/2014 | Tanabe et al. |
| 2014/0313471 A1 | 10/2014 | Eubanks |
| 2014/0327319 A1 | 11/2014 | Byun et al. |
| 2014/0327393 A1 | 11/2014 | Lee et al. |
| 2014/0327409 A1 | 11/2014 | Lee et al. |
| 2014/0340033 A1 | 11/2014 | Kim et al. |
| 2014/0346888 A1 | 11/2014 | Kim et al. |
| 2014/0347006 A1 | 11/2014 | Kim et al. |
| 2014/0354880 A1 | 12/2014 | Han |
| 2014/0361736 A1 | 12/2014 | Kwon et al. |
| 2014/0361738 A1 | 12/2014 | Lee et al. |
| 2014/0375246 A1 | 12/2014 | Boysen, III et al. |
| 2014/0375256 A1 | 12/2014 | Lee et al. |
| 2015/0046418 A1* | 2/2015 | Akbacak ............ G06F 17/3002 707/706 |
| 2015/0049001 A1 | 2/2015 | Rahman et al. |
| 2015/0049201 A1 | 2/2015 | Liu et al. |
| 2015/0060506 A1 | 3/2015 | Cameron et al. |
| 2015/0061589 A1 | 3/2015 | Wodrich et al. |
| 2015/0103304 A1 | 4/2015 | Darcy |
| 2015/0168729 A1 | 6/2015 | Kobayashi |
| 2015/0180286 A1 | 6/2015 | Asanuma et al. |
| 2015/0193980 A1 | 7/2015 | Pedley et al. |
| 2015/0204949 A1 | 7/2015 | Von Novak, III |
| 2015/0236521 A1 | 8/2015 | Park et al. |
| 2015/0244204 A1 | 8/2015 | Lee et al. |
| 2015/0244341 A1 | 8/2015 | Ritter et al. |
| 2015/0244427 A1 | 8/2015 | Kim et al. |
| 2015/0244910 A1 | 8/2015 | Marston et al. |
| 2015/0249361 A1 | 9/2015 | Kim et al. |
| 2015/0249916 A1 | 9/2015 | Schlub et al. |
| 2015/0256021 A1 | 9/2015 | Kwon et al. |
| 2016/0026156 A1 | 1/2016 | Jackson et al. |
| 2016/0033792 A1 | 2/2016 | Blum et al. |
| 2016/0037025 A1 | 2/2016 | Blum |
| 2016/0072296 A1 | 3/2016 | Nejatali et al. |
| 2016/0172870 A1 | 6/2016 | Blum et al. |
| 2016/0190859 A1 | 6/2016 | Blum et al. |
| 2016/0203359 A1 | 7/2016 | von und zu Liechtenstein |
| 2016/0206056 A1 | 7/2016 | Pluemer et al. |
| 2016/0261147 A1 | 9/2016 | Blum et al. |
| 2016/0294225 A1 | 10/2016 | Blum et al. |

FOREIGN PATENT DOCUMENTS

| | | |
|---|---|---|
| CN | 202407553 | 9/2012 |
| CN | 202419070 | 9/2012 |
| CN | 202424276 | 9/2012 |
| CN | 202424277 | 9/2012 |
| CN | 202424278 | 9/2012 |
| CN | 202424279 | 9/2012 |
| CN | 202424807 | 9/2012 |
| CN | 102777487 | 11/2012 |
| CN | 202635909 | 1/2013 |
| CN | 202635910 | 1/2013 |
| CN | 202635911 | 1/2013 |
| CN | 202636015 | 1/2013 |
| CN | 202647093 | 1/2013 |
| CN | 202647094 | 1/2013 |
| CN | 202647101 | 1/2013 |
| CN | 202647104 | 1/2013 |
| CN | 202647111 | 1/2013 |
| CN | 202649874 | 1/2013 |
| CN | 202649875 | 1/2013 |
| CN | 202651825 | 1/2013 |
| CN | 202652281 | 1/2013 |
| CN | 202652282 | 1/2013 |
| CN | 202652304 | 1/2013 |
| CN | 202652305 | 1/2013 |
| CN | 202800463 | 3/2013 |
| CN | 202800547 | 3/2013 |
| CN | 202811809 | 3/2013 |
| CN | 202818399 | 3/2013 |
| CN | 202904151 U | 4/2013 |
| CN | 203178585 | 9/2013 |
| DE | 202009015991 | 4/2010 |
| EP | 0736268 | 10/1996 |
| ES | 2165795 | 3/2002 |
| JP | 07099596 A | 4/1995 |
| JP | 2000138858 A | 5/2000 |
| JP | 4006856 B2 | 11/2007 |
| KR | 20140091195 A | 7/2014 |
| KR | 101646541 | 8/2016 |
| TW | M300818 U | 11/2006 |
| TW | M395176 U | 12/2010 |
| WO | 9208157 A1 | 5/1992 |
| WO | 0106298 A1 | 1/2001 |
| WO | 02/45044 A1 | 6/2002 |
| WO | 2009/052705 A1 | 4/2009 |
| WO | 2011041733 A1 | 4/2011 |
| WO | 2012/039738 A1 | 3/2012 |
| WO | 2012/093986 A1 | 7/2012 |
| WO | 2013118162 A1 | 8/2013 |
| WO | 2013/188343 A1 | 12/2013 |
| WO | 2014/012536 A1 | 1/2014 |
| WO | 2014012451 A1 | 1/2014 |
| WO | 2014/102536 A1 | 7/2014 |
| WO | 2014122538 A2 | 8/2014 |
| WO | 2016022499 A1 | 2/2016 |
| WO | 2016100339 A1 | 6/2016 |
| WO | 2016105480 A2 | 6/2016 |

(56) References Cited

FOREIGN PATENT DOCUMENTS

| WO | 2016109577 A1 | 7/2016 |
|---|---|---|
| WO | 2016141349 A1 | 9/2016 |

OTHER PUBLICATIONS

Blum, Ronald D. et al., U.S. Appl. No. 15/337,796, entitled "Hearing Aid Adapted for Wireless Power Reception", filed Oct. 28, 2016, pp. all.
"Make Your Watch Smart!", http://www.ct-band.com/en/; captured Nov. 10, 2016, pp. all.
"Sleepsport Band", http://www.officesupplynow.com/xcart/GRFGB40139-Griffin-Case-sleepsport-Band-bk.html?gclid=CjwKEAjwnebABRCjpvr13dHL8DsSJABB-ILJBcOqYMmKeCs3g_rcvbST3HVWtuup_HzVQ3-Iv5YFOBoCcK_w_wcB; captured Nov. 10, 2016, pp. all.
"Kairos T-Band Only", https://kairoswatches.com/tbands/tband/; captured Nov. 10, 2016, pp. all.
"Glance: World's First Smart Accessory for Your Watch", https://www.kickstarter.com/projects/1742184757/glance-worlds-first-smart-accessory-for-your-watch; captured Nov. 10, 2016, pp. all.
"Fitbit Pouch for Watch Strap", https://www.etsy.com/listing/186507712/fitbit-pouch-for-watch-strap; captured Nov. 10, 2016, pp. all.
"Classi: The World's First Leather Smart Strap for Classic Watches", http://www.maintool.me/classi.html; captured Nov. 10, 2016, pp. all.
"Marathon Watch Band Clip Compass", http://www.chronoworld.com/marathon-watch-band-clip-compass-co194004.html; captured Nov. 10, 2016, pp. all.
"Modillion Turns Any "Dumb" Watch Into a Smart Watch", http://newatlas.com/modillian-smartwatch-strap/32059/; captured Nov. 10, 2016, pp. all.
"Wearable Technology Meets the Art of Fine Watchmaking", http://www.montblanc.com/en-us/discover/specials/montblanc-introduces-e-strap.html; captured Nov. 10, 2016, pp. all.
"Multi Functional Pouch Armband Ankel Band Wristband for Fitbit Flex Fitbit One Clip . . . ", https://www.amazon.com/functional-armband-wristband-smartband-withings/dp/B00WALZXCW; captured Nov. 10, 2016, pp. all.
"Review of 1Bandid Sports & GPS Watch ID Bands", https://www.dcrainmaker.com/2011/09/review-of-1bandid-sports-gps-watch-id.html; captured Nov. 10, 2016, pp. all.
"This Weird Strap Lets You Make Phone Calls From Your Regular Watch", https://www.kickstarter.com/projects/hotsmartwatch/hot-band-the-smart-watch-band-for-any-watch?token=5d08da6f; captured Nov. 10, 2016, pp. all.
"Skyview Pinnacle", https://www.nicogerard.com/nico-gerard-skyview-pinnacle; captured Nov. 10, 2016, pp. all.
"Custom Watchband Holder for Fitbit Flex", http://www.shapeways.com/product/YWXHN5VYP/custom-watchband-holder-for-fitbit-flex?optionid=17995763; captured Nov. 10, 2016, pp. all.
""Unique" Hand-Made Strap Discretely Adds Smart Features to Any Watch", http://newatlas.com/unique-smartwatch-strap/39458/; captured Nov. 10, 2016, pp. all.
"Transform Your Wristwatch Into a Smart Device", http://www.wotch.de/; captured Nov. 10, 2016, pp. all.
"Inductive Limits in the Frequency Range 9 kHz to 148.5 kHz", ECC Reports 135, Electronic Communications Committee (ECC) with the European Conference of Postal and Telecommunications (CEPT); Bordeaux, Sep. 2009, pp. 1-16.
International Search Report and Written Opinion for ROC (Taiwan) Pat. Appln. No. 104143454 dated Sep. 8, 2016; pp. all.
Design U.S. Appl. No. 29/556,571, entitled "Eyewear Temple", filed Mar. 1, 2016 (no copy provided in accordance with the 1287 O.G. 163 waiver published Oct. 19, 2004); pp. all.
U.S. Appl. No. 15/179,018, entitled "Eyewear With Magnetic Track for Electronic Wearable Device", filed Jun. 10, 2016 (no copy provided in accordance with the 1287 O.G. 163 waiver published Oct. 19, 2004); pp. all.
U.S. Appl. No. 15/183,368, entitled "Wireless Power Systems and Methods Suitable for Charging Wearable Electronic Devices", filed Jun. 15. 2016 (no copy provided in accordance with the 1287 O.G. 163 waiver published Oct. 19, 2004); pp. all.
Second Office Action received for ROC (Taiwan) Pat. Appln. No. 104143454 dated Jan. 3, 2017; pp. all.

* cited by examiner

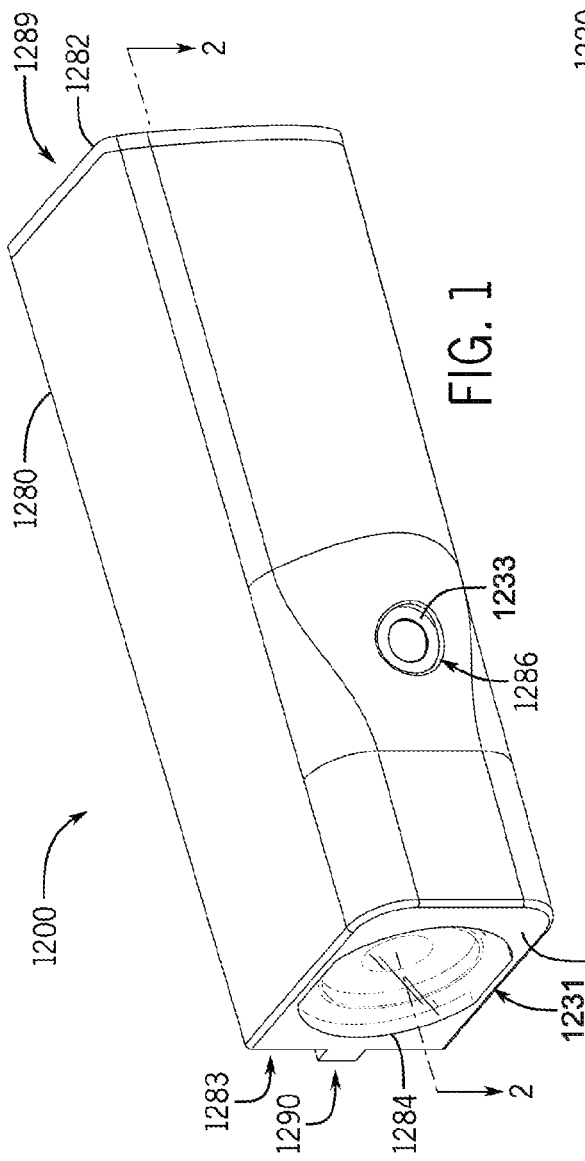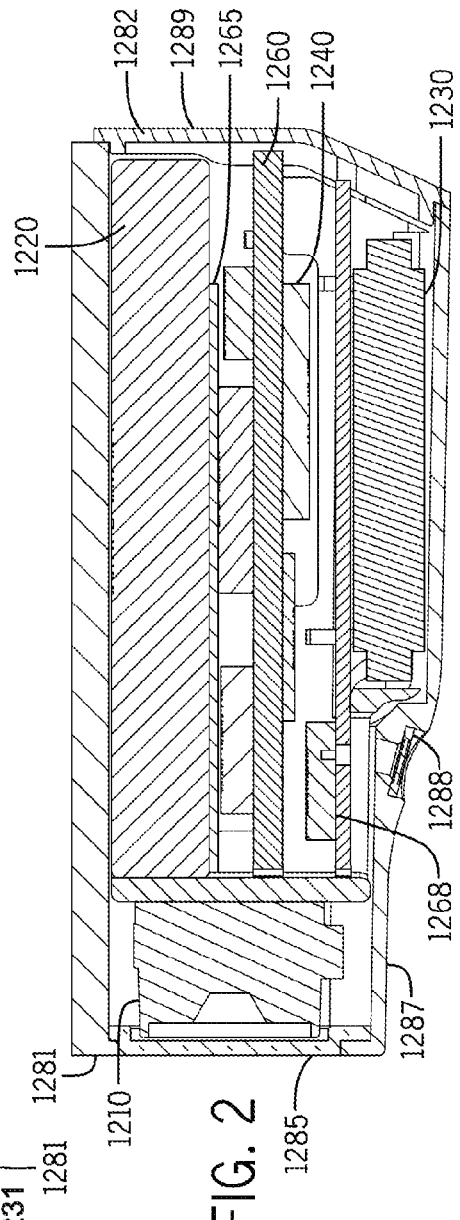

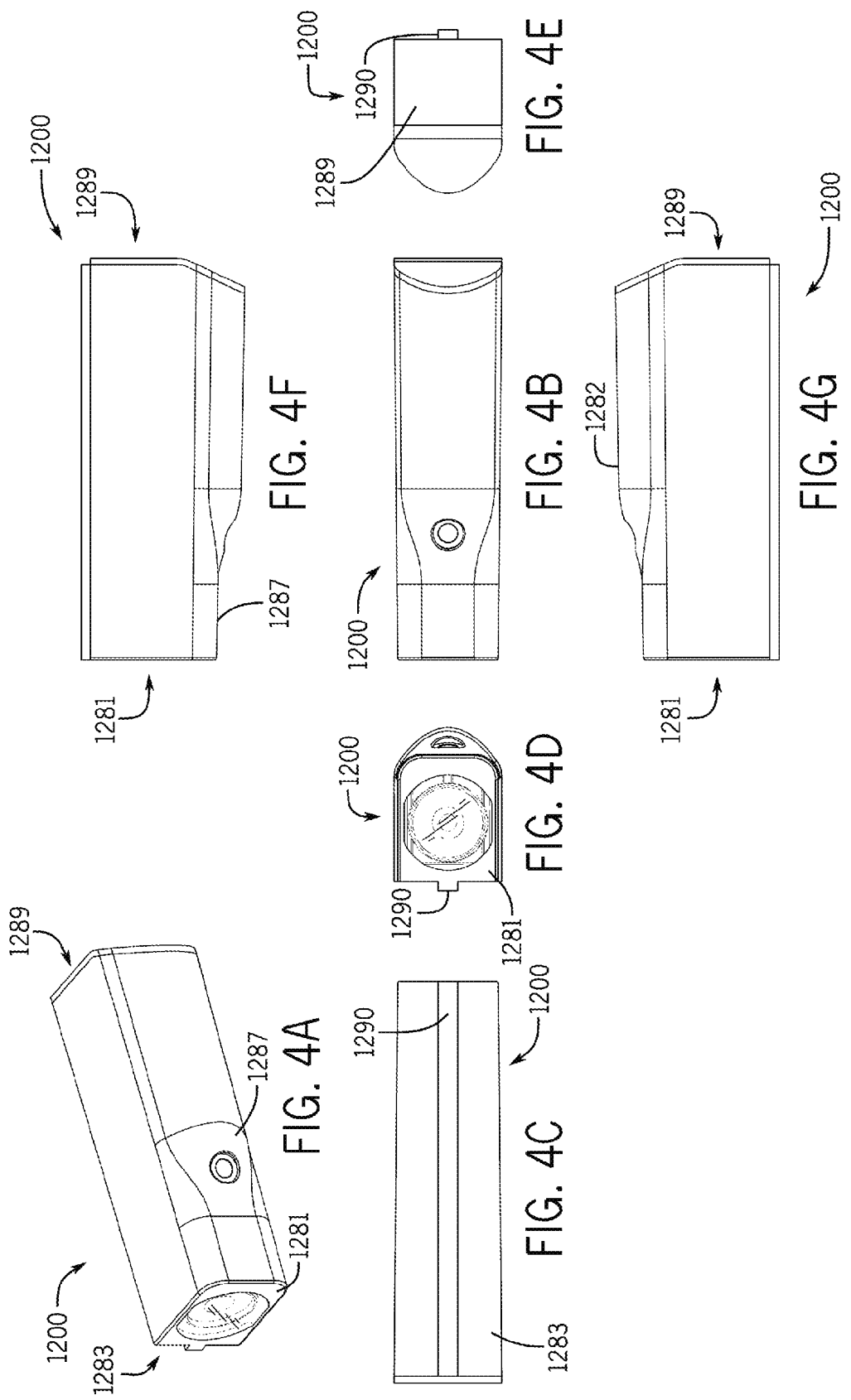

WIRELESS CAMERA SYSTEMS AND METHODS

CROSS-REFERENCE TO RELATED APPLICATIONS

This application claims the benefit under 35 U.S.C. 119 of the earlier filing date of U.S. Provisional Application 62/095,920 entitled "CAMERA SYSTEM COMPRISING WIRELESS POWER AND DATA TRANSFER", filed Dec. 23, 2014. The aforementioned provisional application is hereby incorporated by reference in its entirety, for any purpose.

This application claims the benefit under 35 U.S.C. 119 of the earlier filing date of U.S. Provisional Application 62/104,418 entitled "ENHANCED CAMERA SYSTEM COMPRISING WIRELESS POWER AND DATA TRANSFER", filed Jan. 16, 2015. The aforementioned provisional application is hereby incorporated by reference in its entirety, for any purpose.

This application claims the benefit under 35 U.S.C. 119 of the earlier filing date of U.S. Provisional Application 62/113,573 entitled "ENHANCED CAMERA SYSTEM COMPRISING HIGHLY RESONANT COUPLING", filed Feb. 9, 2015. The aforementioned provisional application is hereby incorporated by reference in its entirety, for any purpose.

This application claims the benefit under 35 U.S.C. 119 of the earlier filing date of U.S. Provisional Application 62/116,648 entitled "FURTHER ENHANCED CAMERA SYSTEM COMPRISING HIGH RESONANT COUPLING", filed Feb. 16, 2015. The aforementioned provisional application is hereby incorporated by reference in its entirety, for any purpose.

This application claims the benefit under 35 U.S.C. 119 of the earlier filing date of U.S. Provisional Application 62/127,622 entitled "HIGHLY RESONANT COUPLED CAMERA SYSTEM", filed Mar. 3, 2015. The aforementioned provisional application is hereby incorporated by reference in its entirety, for any purpose.

This application claims the benefit under 35 U.S.C. 119 of the earlier filing date of U.S. Provisional Application 62/128,362 entitled "CAMERA EYEWEAR SYSTEM", filed Mar. 4, 2015. The aforementioned provisional application is hereby incorporated by reference in its entirety, for any purpose.

This application claims the benefit under 35 U.S.C. 119 of the earlier filing date of U.S. Provisional Application 62/153,999 entitled "CAMERA SYSTEM CAPABLE OF WIRELESS ENERGY TRANSFER", filed Apr. 28, 2015. The aforementioned provisional application is hereby incorporated by reference in its entirety, for any purpose.

This application claims the benefit under 35 U.S.C. 119 of the earlier filing date of U.S. Provisional Application 62/154,019 entitled "CAMERA EYEWEAR SYSTEM", filed Apr. 28, 2015. The aforementioned provisional application is hereby incorporated by reference in its entirety, for any purpose.

This application claims the benefit under 35 U.S.C. 119 of the earlier filing date of U.S. Provisional Application 62/167,739 entitled "FURTHER ENHANCED CAMERA SYSTEM CAPABLE OF WIRELESS ENERGY TRANSFER", filed May 28, 2015. The aforementioned provisional application is hereby incorporated by reference in its entirety, for any purpose.

This application claims the benefit under 35 U.S.C. 119 of the earlier filing date of U.S. Provisional Application 62/173,788 entitled "ROBUST CAMERA SYSTEM CAPABLE OF WIRELESS ENERGY TRANSFER", filed Jun. 10, 2015. The aforementioned provisional application is hereby incorporated by reference in its entirety, for any purpose.

This application claims the benefit under 35 U.S.C. 119 of the earlier filing date of U.S. Provisional Application 62/180,199 entitled "WIRELESS ENERGY TRANSFER CAMERA SYSTEM", filed Jun. 16, 2015. The aforementioned provisional application is hereby incorporated by reference in its entirety, for any purpose.

This application claims the benefit under 35 U.S.C. 119 of the earlier filing date of U.S. Provisional Application 62/186,341 entitled "WIRELESS ENERGY TRANSFER CAMERA SYSTEM", filed Jun. 29, 2015. The aforementioned provisional application is hereby incorporated by reference in its entirety, for any purpose.

This application claims the benefit under 35 U.S.C. 119 of the earlier filing date of U.S. Provisional Application 62/189,916 entitled "WIRELESS ENERGY TRANSFER CAMERA SYSTEM COMPRISING ENERGY HARVESTING", filed Jul. 8, 2015. The aforementioned provisional application is hereby incorporated by reference in its entirety, for any purpose.

TECHNICAL FIELD

The present disclosure relates to systems and methods for providing power wirelessly to one or more electronic devices such as cameras.

BACKGROUND

The number and types of commercially available electronic wearable devices continues to expand. Forecasters are predicting that the electronic wearable devices market will more than quadruple in the next ten years. Some hurdles to realizing this growth remain. Two major hurdles are the cosmetics/aesthetics of existing electronic wearable devices and their limited battery life. Consumers typically desire electronic wearable devices to be small, less noticeable, and require less frequent charging. Typically, consumers are unwilling to compromise functionality to obtain the desired smaller form factor and extended battery life. The desire for a small form factor yet a longer battery life are goals which are in direct conflict with one another and which conventional devices are struggling to address. Further solutions in this area may thus be desirable.

SUMMARY

A camera according to some examples of the present disclosure may include an image capture device, a receiver configured to receive power wirelessly from a distance separated transmitting coil of a wireless power transfer system which includes a base unit, a rechargeable battery coupled to the receiver for storing wirelessly received power, and a memory configured to store images captured with the image capture device. In some examples, the another computing device may be the base unit of the wireless power transfer system. The camera may be configured to transfer data including one or more images captured with the image capture device to another computing device. In some examples, the camera may be a wearable camera. In some examples, the camera may be waterproof. In some examples, the camera may be devoid of a view finder.

In some examples, the camera's receiver may include a receiving coil having a magnetic core. In some examples, the magnetic core may include a ferrite core. In some examples, the receiving coil is configured to receive power from the transmitting coil regardless of orientation between the receiving and transmitting coils. In some examples, at least the image capture device, the receiving coil, the processor, and the memory are enclosed in a housing configured to be movably coupled to a wearable article. In some examples, the housing includes a guide comprising one or more magnets for magnetically attaching the wearable camera to eyewear. In some examples, the housing may include a first opening and an optically transparent material spanning the first opening, and a second opening and an acoustically transparent material spanning the second opening.

In some examples, the camera may include a microphone. In some examples, the camera may be configured to detect an audible command and capture an image responsive to the audible command. In some examples, the camera may include a transmitter configured to transmit one or more of the images stored in the memory to the wireless power transfer system. In some examples, the camera may be configured to broadcast a proximity signal for detecting the wireless power receiver in proximity. In some examples, the camera may include at least one user control for receiving user input. In some examples, the at least one user control may include a capacitive switch. In some examples, the camera may include a status indicator, a privacy indicator, or combinations thereof. In some examples, the camera may include an aperture for engaging with a securing ring. In further examples, the camera may include a guide configured to engage a temple guide in an eyewear frame, and wherein a plane of a diameter of the aperture is parallel with a longitudinal direction of the guide. In some examples, the securing ring may be made of a transparent plastic material. In some examples, the securing ring may include a core diameter greater than 0.01 mm and less than 2 mm. In some examples, the core diameter may be less than 1 mm.

A system according to the present disclosure may include a base unit which includes a transmitter configured for wireless power delivery and a battery coupled to the transmitter, wherein the transmitter includes a transmitting coil having a magnetic core. The system may further include a camera, which may be a wearable camera, separated from the base unit, the camera including a receiver inductively coupled to the transmitter to receive power from the base unit while the camera remains within a charging distance from the base unit, wherein the receiver includes a receiving coil having a magnetic core, and wherein a dimension of the transmitting coil is at least twice a dimension of the receiving coil. In some examples, the dimension of the transmitting coil may be a diameter of the transmitting coil, a length or a diameter of a wire forming windings of the transmitting coil, a number of windings of the transmitting coil, or a length, a diameter or a surface area of the core of the transmitting coil, and the dimension of the receiving coil may respectively be a diameter of the receiving coil, a length or a diameter of a wire forming windings of the receiving coil, a number of windings of the receiving coil, or a length, a diameter or a surface area of the core of the receiving coil. In some examples, the transmitter and receiver may be configured for operation with a Q value less than 100. In some examples, the transmitter and receiver may be configured to operate at a frequency within the range of 50 kHz or 500 kHz, wherein the transmitter and receiver are configured to operate in weak resonance, and wherein the system is configured to operate using an amount of guided flux. In some examples, the base unit may be mechanically coupled to a portable communication device. In some examples, the transmitter may include an omnidirectional antenna configured to transmit power to one or more electronic devices including the camera regardless of orientation of the electronic devices with respect to the base unit. In some examples, the camera, which may be a wearable camera, may be configured to be magnetically attached to eyewear.

A method according to some examples may include placing a base unit proximate a wearable camera, the base unit comprising a transmitting coil configured to inductively couple with a receiving coil in the wearable camera to wirelessly transmit power to the wearable camera, detecting the wearable camera with the base unit, and wirelessly transmitting power from the base unit to the wearable camera while the electronic device remains within a charging range of the base unit or until a charge state signal of the wearable camera corresponds to a fully charged state of the wearable camera. In some examples, the method may further include capturing an image responsive to an audible command detected by the wearable camera. In some examples, the method may further include wirelessly transmitting an image captured by the camera to the base unit. In some examples, the detecting the wearable camera includes automatically detecting a signal from the wearable camera, the signal broadcast by the wearable camera or transmitted to the base unit responsive to an interrogation signal from the base unit. In some examples, the wirelessly transmitting power from the base unit includes broadcasting power signals at a body-safe level. In some examples, the wirelessly transmitting power from the base unit includes broadcasting power signals at a frequency within the range of 50 kHz or 500 kHz.

BRIEF DESCRIPTION OF THE DRAWINGS

Features, aspects and attendant advantages of the present invention will become apparent from the following detailed description of various embodiments, including the best mode presently contemplated of practicing the invention, when taken in conjunction with the accompanying drawings, in which:

FIG. 1 illustrates an isometric view of a camera in accordance with some examples herein;

FIG. 2 illustrates a cross-sectional view of the camera in FIG. 1 taken at line 2-2;

FIGS. 4A-4G illustrate isometric, top, bottom, front, back, left and right side views, respectively, of the camera in FIG. 1;

DETAILED DESCRIPTION

Figure 3A:
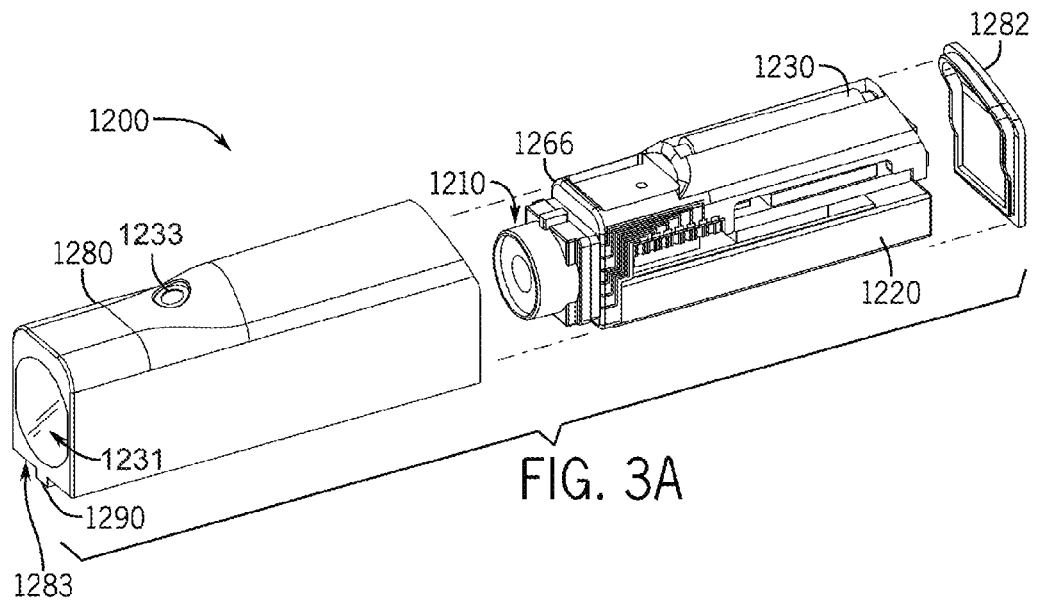
FIGS. 3A and 3B illustrate exploded views of the camera in FIG. 1.
Figure 3B:
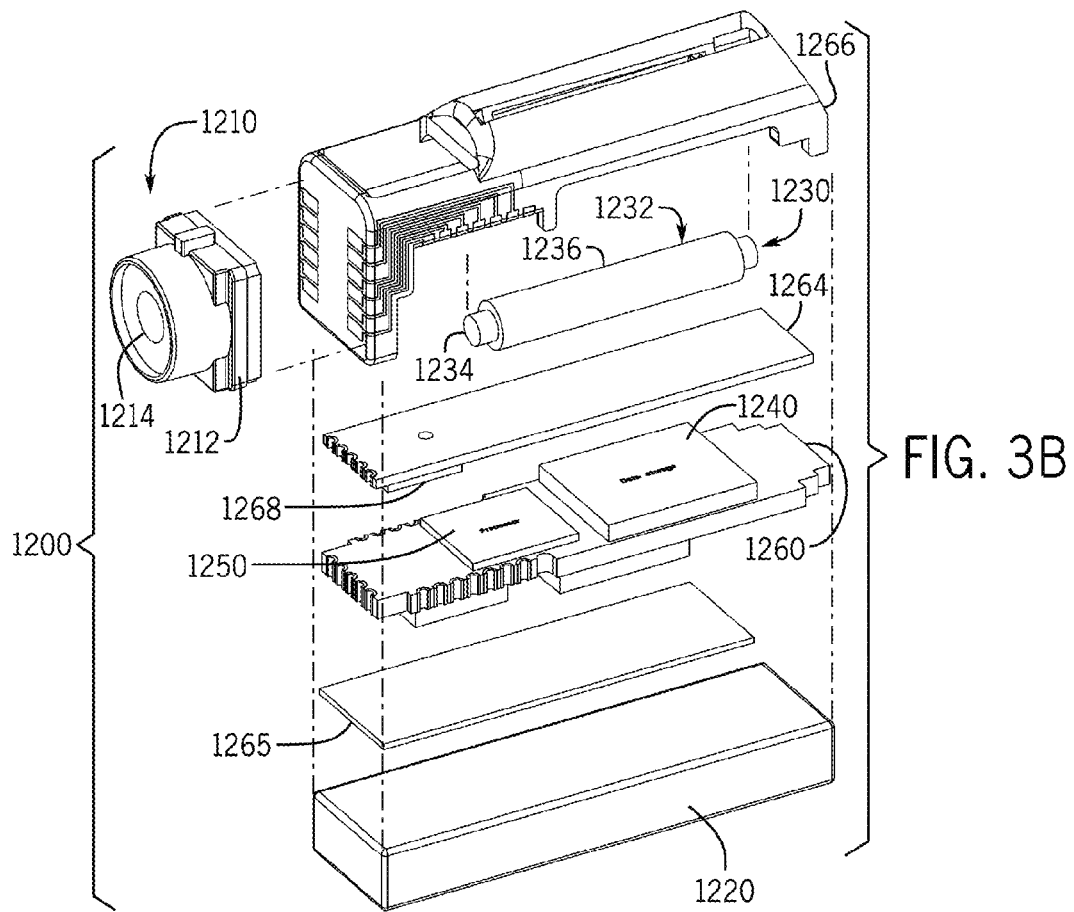

Systems, methods and apparatuses for wirelessly powering electronic devices, for example a camera such as a wearable camera, are described. According to some examples, an electronic device, for example a wearable camera, may be configured to receive power wirelessly from a distance separated transmitter of a base unit, which may be part of a wireless power transfer system. The base unit and/or wearable electronic device may be part of an eco-system which may include any number of energy transmitting devices (e.g., base units) and any number of energy receiving devices (e.g., wearable electronic devices). The electronic device (e.g., camera) may be placed within a charging zone (e.g., hotspot) of the base unit and configured to receive power wirelessly from the base unit while the electronic device remains within the hotspot. The electronic device may include a receiver (e.g., a receiving coil) and the base unit may include a transmitter (e.g., transmitting coil). The receiver of the wearable electronic device and the transmitter of the base unit may be inductively coupled to enable the wearable electronic device to receive power wirelessly from the base unit. The transmitter and receiver may be configured to operate at a body safe frequency. For example, the transmitter and receiver may be configured to operate at a frequency within the range of about 50 kHz or about 500 kHz. In some examples, the transmitter and receiver may be configured to operate at a frequency within the range of about 75 kHz to about 175 kHz. In some examples, the transmitter and receiver may be configured to operate in weak resonance. In some examples, the transmitter and receiver may be configured for operation with a Q value less than 100. In some examples, the wireless power transfer system may operate using an amount of guided flux.

As described, the electronic device according to some examples herein may be a camera. FIGS. 1-4 show views of a camera 1200 in accordance with some examples of the present disclosure. The camera 1200 may be configured to record audiovisual data. The camera 1200 may include an image capture device 1210, a battery 1220, a receiver 1230, a memory 1240, and a controller 1250. The image capture device 1210 may include an image sensor 1212 and an optical component (e.g., camera lens 1214). The image capture device may be configured to capture a variety of visual data, such as image stills, video, etc. Thus, images or image data may interchangeably be used to refer to any images (including video) captured by the camera 1200. In some examples, the camera 1200 may be configured to record audio data. For example, the camera 1200 may include a microphone 1268 operatively coupled to the memory 1240 for storing audio detected by the microphone 1268.

The controller 1250 may be implemented in hardware and/or software. For example, the controller 1250 may be implemented using one or more application specific integrated circuits (ASICs). In some examples, some or all of the functionality of the controller 1250 may be implemented in processor-executable instructions, which may be stored in memory onboard the camera (e.g., memory 1240). In some examples the camera may wirelessly receive instructions for performing certain functions of the camera, e.g., initiating image/video capture, initiating data transfer, setting parameters of the camera, and the like. The processor-executable instructions, when executed by a processor 1252 onboard the camera 1200 may program the camera 1200 to perform functions, as described further below. Any combination of hardware and/or software components may be used to implement the functionality of a camera according to the present disclosure (e.g., camera 1200).

The battery 1220 may be a rechargeable battery such as a Nickel-Metal Hydride (NiMH), a Lithium ion (Li-ion), or a Lithium ion polymer (Li-ion polymer) battery. The battery 1220 may be operatively coupled to the receiver to store power received wirelessly from a distance separated wireless power transfer system. In some example, the battery may be coupled to energy generator (e.g., an energy harvesting device) onboard the camera. Energy harvesting devices may include, but are not limited to, kinetic-energy harvesting devices, solar cells, thermoelectric generators, or radio-frequency harvesting devices.

The receiver 1230 may include a receiving coil 1232 configured to couple inductively with a distance separated transmitting coil (e.g., Tx coil 112, Tx coil 312), which may be part of a base unit (e.g., base unit 100, 300) in a wireless power transfer system (e.g., system 10). The receiving coil 1232 may include a magnetic core 1234 with conductive windings 1236. The windings may include copper wire (also referred to as copper windings). In some examples, the copper wire may be monolithic copper wire (e.g., single-strand wire). In some examples, the copper wire may be multi-strand copper wire (e.g., Litz wire), which may reduce resistivity due to skin effect in some examples, which may improve the power transfer between the receiving coil and transmitting coil. In some examples, the magnetic core 1234 may be a ferrite core (interchangeably referred to as ferrite rod). The ferrite core may comprise a medium permeability ferrite, for example 78 material supplied by Fair-Rite Corporation. In some examples, the ferrite core may comprise a high permeability material, such as Vitroperm 500F supplied by Vacuumschmelze in Germany. Ferrite cores comprising other ferrite materials may be used. In some examples, the ferrite may have a medium permeability of micro-i ($\mu$) of about 2300. In some examples, the ferrite may have permeability of micro-i ($\mu$) ranging from about 200 to about 5000. In some examples, different magnetic material may be used for the magnetic core.

Figure 7:
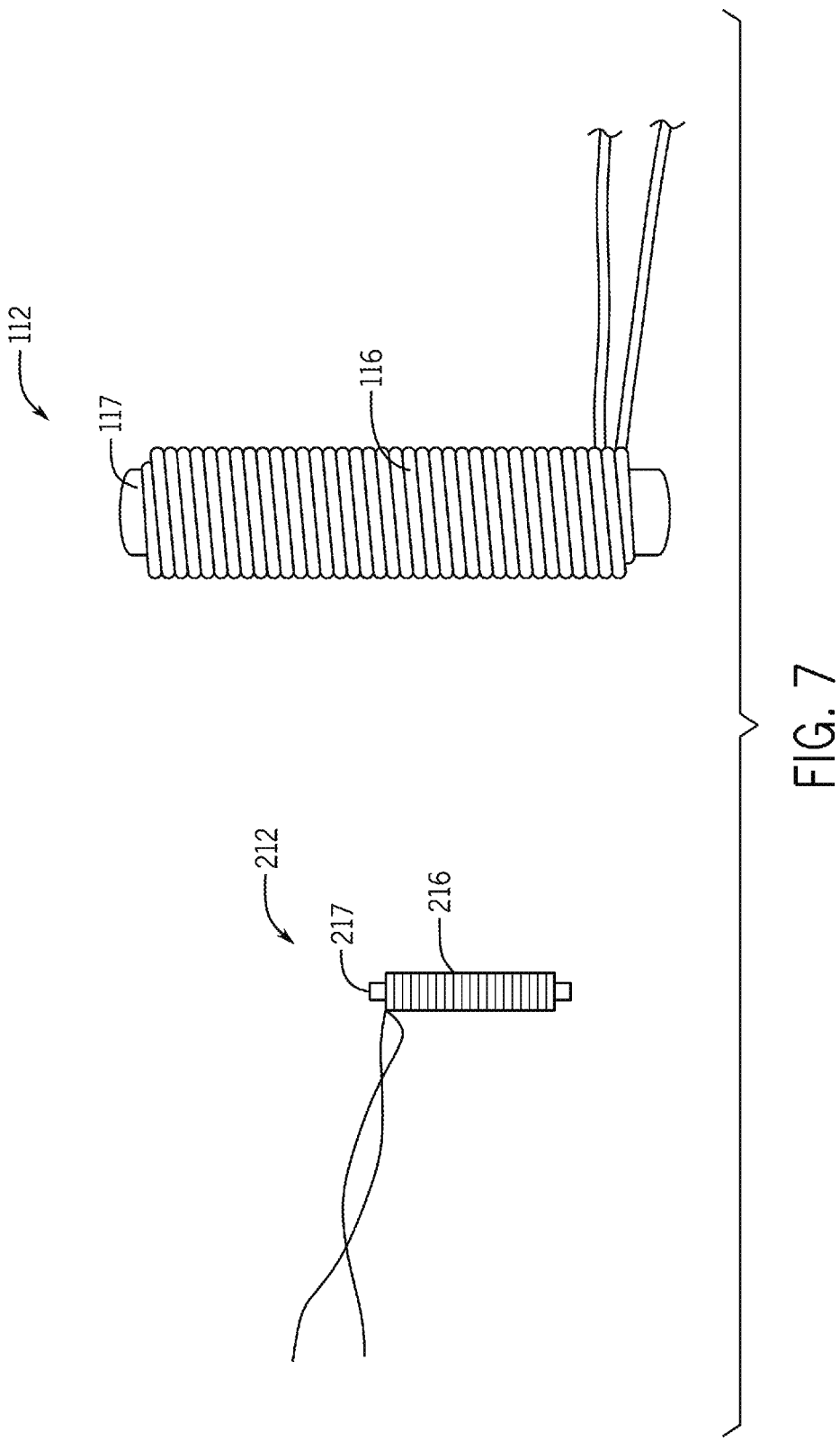
FIG. 7 illustrates an example of a receiving coil for an electronic device such as the camera in FIG. 1, and a transmitting coil for a base unit in accordance with the present disclosure.

In some examples, the receiver 1230 may be configured to loosely inductively couple to a transmitter (e.g., a transmitter 110 of base unit 100). For example, the receiving coil 1232 may be configured to loosely inductively couple to a transmitting coil of the base unit. As will be further described below, the transmitting coil may include a magnetic core with windings. Similar materials may be used for the core and windings of the transmitting coil; however the receiving and transmitting coils may differ significantly in size, e.g., as illustrated in FIG. 7 and as will be further described. In some examples, the receiving coil may be configured to receive power from the transmitting coil regardless of relative orientation between the receiving and transmitting coils. Generally, a transmitting coil of a base unit according to the examples herein may utilize a magnetic core, which may in some examples shape the field provided by the transmitting coil, as the field lines may preferentially go through the magnetic core and in this manner a partially guided flux may be used where a portion of the flux is guided by the magnetic core. In some examples, the receiving coil 1232 of the electronic device may be configured to resonantly inductively couple to the transmitting coil.

In some examples, the memory 1240 of the camera may store processor-executable instructions for performing functions of the camera described herein. In such examples, a micro-processor may be operatively coupled to the memory and configured to execute the processor-executable instruction to cause the camera to perform functions, such as cause power to be selectively received upon detection of the wireless power receiver in proximity, cause images to be captured upon receiving an image capture command, and/or cause images to be stored in the memory. In some examples, the memory 1240 may be configured to store user data including image data (e.g., images captured with the camera 1200). In some examples, the user data may include configuration parameters. Although certain electronic components, such as the memory 1240 and processor 1252 are discussed in the singular, it will be understood that the camera may include any number of memory devices and any number of processors and other appropriately configured electronic components.

The memory 1240 and processor 1252 may be connected to a main circuit board 1260 (e.g., main PCB). The main circuit board 1260 may support one or more additional components, such as a wireless communication device (e.g., a Wi-Fi or Bluetooth chip), microphone and associated circuitry 1268, and others. In some examples, one or more of these components may be supported by separate circuit boards (e.g., auxiliary board 1264) operatively coupled to the main circuit board 1260. In some examples, some of the functionality of the camera may be incorporated in a plurality of separate IC chips or integrated into a single processing unit.

The electronic components of camera 1200 may be packaged in a housing 1280, which may be made from a variety of rigid plastic materials known in the consumer electronics industry. In some examples, a thickness of the camera housing 1280 may range from about 0.3 mm to about 1 mm. In some examples, the thickness may be about 0.5 mm. In some examples, the thickness may exceed 1 mm. A camera according to the present disclosure may be a miniaturized self-contained electronic device, e.g., a miniaturized point-and-shoot camera. The camera 1200 may have a length of about 8 mm to about 50 mm. In some examples, the camera 1200 may have a length from about 12 mm to about 42 mm. In some examples, the camera 1200 may have a length not exceeding 42 mm. In some examples the camera 1200 may be about 12 mm long. The camera 1200 may have a width of about 8 mm to about 12 mm. In some examples, the camera 1200 may be about 9 mm wide. In some example, the camera 1200 may have a width not exceeding about 10 mm. In some example, the camera 1200 may have a height of about 8 mm to about 15 mm. In some examples, the camera 1200 may be about 9 mm high. In some examples, the camera 1200 may have a height not exceeding about 14 mm. In some examples, the camera 1200 may weigh from about 5 grams to about 10 grams. In some examples the camera 1200 may weigh about 7 grams or less. In some examples, the camera 1200 may have a volume of about 6,000 cubic millimeters or less. In some examples, the camera 1200 may be a waterproof camera. In some examples, the camera may include a compliant material, e.g., forming or coating at least a portion of an exterior surface of the camera 1200. This may provide functionality (e.g., accessibility to buttons through a waterproof enclosure) and/or comfort to the user.

The electronic components may be connected to the one or more circuit boards (e.g., main PCB 1260, auxiliary circuit board 1264) and electrical connection between the boards and/or components thereon may be formed using known techniques. In some examples, circuitry may be provided on a flexible circuit board, or a shaped circuit board, such as to optimize the use of space and enable packaging of the camera within a small form factor. For example, a molded interconnect device 1266 may be used to provide connectivity between one or more electronic components on the one or more boards. The electronic components may be stacked and/or arranged within the housing for optimal fit within a miniaturized enclosure. For example, the main circuit board 1260 may be provided adjacent another component (e.g., the battery 1220) and attached thereto via an adhesive layer 1265. In some examples, the main PCB may support IC chips on both sides of the board in which case the adhesive layer may attach to packaging of the IC chips, a surface of a spacing structure provided on the main PCB and/or a surface of the main PCB. In other examples, the main PCB and other circuit boards may be attached via other conventional mechanical means, such as fasteners.

In some examples, the camera 1200 may be waterproof. The housing 1280 may provide a waterproof enclosure for the internal electronics (e.g., the image capture device 1210, battery 1220, receiver 1230, and circuitry). After the internal components are assembled into the housing 1280, a cover 1282 may be irremovably attached, such as via gluing or laser welding, for example. In the illustrated example, the cover 1282 is provided on the back side 1289 of the camera. In other examples, the cover may be located elsewhere, such as along the base 1283 or sidewall 1287 of the camera. In some examples, the cover 1282 may be removable (e.g., for replacement of the battery and/or servicing of the internal electronics) and may include one or more seals.

In some examples, the housing 1280 may include one or more openings for optically and/or acoustically coupling internal components to the ambiance. In some examples, the camera may include a first opening 1284 on a front side 1281 of the camera 1200. An optically transparent (or nearly optically transparent) material 1285 may be provided across the first opening 1284 thereby defining a camera window 1231 for the image capture device 1210. The camera window 1231 may be sealingly integrated with the housing 1280, for example by an overmolding process in which the optically transparent material 1285 is overmolded with the plastic material forming the housing 1280. The image capture device 1210 may be positioned behind the camera window 1231 with the lens 1214 of the image capture device 1210 facing forward through the optically transparent material 1285. In some examples, an alignment or orientation of the image capture device 1210 may be adjustable.

A second opening 1286 may be provided along a sidewall 1287 of the housing 1280. The second opening 1286 may be arranged to acoustically couple the microphone 1268 with the ambiance. A substantially acoustically transparent material 1288 may be provided across the second opening 1286 to serve as a microphone protector plug 1233 (e.g., to protect the microphone from being soiled or damaged by water or debris) without substantially interfering with the operation of the microphone. The acoustically transparent material 1288 may be configured to prevent or reduce water ingress through the second opening 1286. For example, the acoustically transparent material 1288 may comprise a water impermeable mesh. The mesh may be a micro-mesh sized with a mesh density selected to prevent water from passing through the mesh. In some examples, the mesh may include (e.g., formed of, or coated with) an hydrophobic material.

The microphone 1268 may be configured to detect sounds, such as audible commands, which may be used to control certain operations of the camera 1200. In some examples, the camera 1200 may be configured to capture an image responsive to an audible command. In some examples, the audible command may be a spoken word or it may be a non-speech sound such as the click of teeth, the click of a tongue, or smack of lips. The camera 1200 may detect the audible command (e.g., in the form of an audible sound) and perform an action, such as capture an image, transfer data, or others.

In some examples, the camera 1200 may be configured to transfer data wirelessly to another electronic device, for example a base unit of the wireless power transfer system. For example, the camera 1200 may transfer images captured by the image capture device for processing and/or storage elsewhere such as on the base unit and/or another computing device (e.g., personal computer, laptop, mobile phone, tablet, or a remote storage device such as cloud storage). Images captured with the camera 1200 may be processed (e.g., batch processed) by the other computing device, as will be further described. Data may be transferred from the camera 1200 to the other electronic device (e.g., base unit, a personal computing device, the cloud) via a separate wireless communication device (e.g., Wi-Fi or Bluetooth enabled device) or via the receiver/transmitter of the camera 1200, which in such instances would be configured to also transmit signals in addition to receiving signals (e.g., power signals). In other words, in some examples, the receiver 1230 may in some examples be also configured as a transmitter such that the receiver 1230 is operable in transmit mode as well as receive mode. In other examples, a separate transmitter (e.g., separate transmitting coil that includes a magnetic core and conductive windings) may alternatively or additionally be provided.

Figure 11:
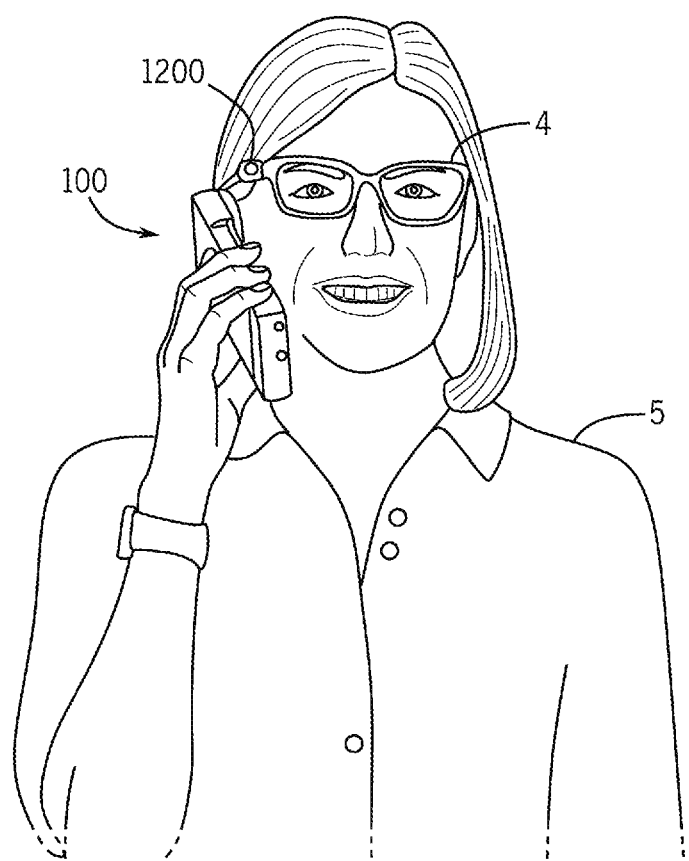
FIG. 11 illustrates a typical use scenario of a base unit with a wearable camera in accordance with the present disclosure.

The camera 1200 may be a wearable camera. In this regard the camera 1200 may be configured to be attached to a wearable article, such as eyewear (e.g., as shown in FIG. 11). In some examples, the camera may be removably attached to a wearable article. That is, the camera may be attachable to the wearable article (e.g., eyewear), detachable from the wearable article (e.g., eyewear), and may be further configured to be movable on the wearable article while attached thereto. In some examples, the wearable article may be any article worn by a user, such as by way of example only, a ring, a band (e.g., armband, wrist band, etc.), a bracelet, a necklace, a hat or other headgear, a belt, a purse strap, a holster, or others. The term eyewear includes all types of eyewear, including and without limitation eyeglasses, safety and sports eyewear such as goggles, or any other type of aesthetic, prescription, or safety eyewear. In some examples, the camera 1200 may be configured to be movably attached to a wearable article, such as eyewear, for example via a guide 1290 configured to engage a corresponding guide on the eyewear, e.g., track 6 in FIG. 6. The guide 1290 on the camera may be configured to slidably engage the guide on the eyewear. In some examples, the guide on the eyewear may be provided on the eyewear frame, e.g., on a temple of the eyewear. The camera 1200 may be configured to be attachable, detachable, and re-attachable to the eyewear frame. In some examples, the guide 1290 may be configured for magnetically attaching the camera 1200 to the eyewear. In this regard, one or more magnets may be embedded in the guide 1290. The guide 1290 may be provided along a bottom side 1283 (also referred to as a base 1283) of the camera 1200. The guide 1290 may be implemented as a protrusion (also referred to as male rail or simply rail) which is configured for a cooperating sliding fit with a groove (also referred to as female track or simply track) on the eyewear. The one or more magnets may be provided on the protrusion or at other location(s) along the base 1283. The eyewear may include a metallic material (e.g., along a temple of the eyewear) for magnetically attracting the one or more magnets on the camera. The camera may be configured to couple to the eyewear in accordance with any of the examples described in U.S. patent application Ser. No. 14/816,995, filed Aug. 3, 2015, and titled "Wearable Camera Systems and Apparatus and Method for Attaching Camera Systems or Other Electronic Device to Wearable Article," which application is incorporated herein in its entirety for any purpose.

As described, the camera 1200 may be configured to receive power wirelessly, e.g., from a base unit of a wireless power system. An example of a wireless power transfer system is illustrated and described further with reference to FIGS. 5-11.

Figure 5:
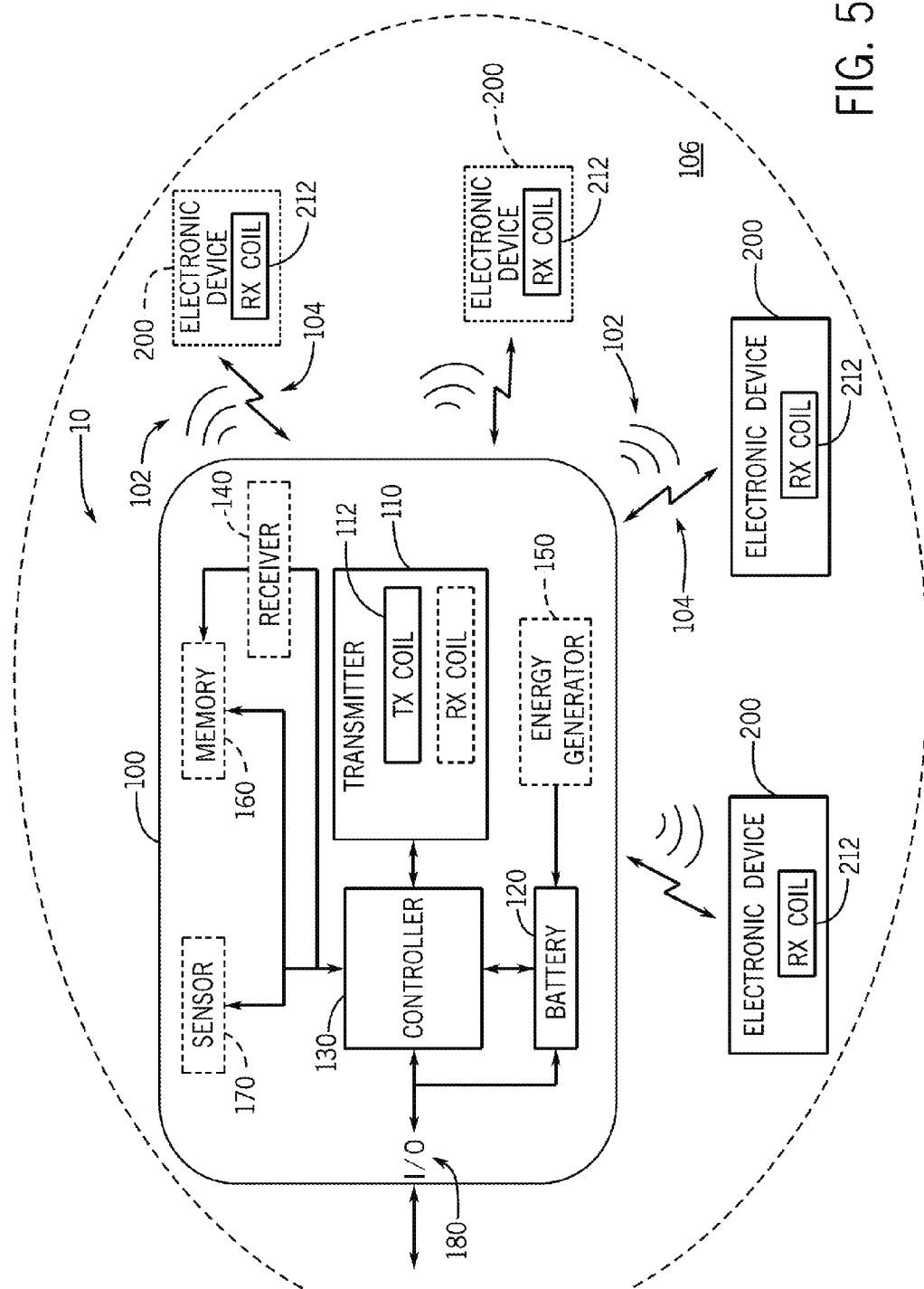
FIG. 5 illustrates a block diagram of a wireless power transfer system according to examples of the present disclosure.

FIG. 5 shows a block diagram of a system for wirelessly powering one or more electronic devices according to some examples of the present disclosure. The system 10 includes a base unit 100 and one or more electronic devices 200. The base unit 100 is configured to wirelessly provide power to one or more of the electronic devices 200, which may be separated from the base unit by a distance. The base unit 100 is configured to provide power wirelessly to an electronic device 200 while the electronic device remains within a threshold distance (e.g., a charging range or charging zone 106) of the base unit 100. The base unit 100 may be configured to selectively transmit power wirelessly to any number of electronic devices (e.g., 1, 2, 3, 4, 5, 6, 7, 8, 9, or 10 although a greater number than 10 devices may be charged in some examples) detected to be within a proximity (e.g., within the charging range) of the base unit 100. Although the electronic device 200 may typically be charged (e.g., coupled to the base unit for charging) while being distance-separated from the base unit 100, it is envisioned and within the scope of this disclosure that the base unit 100 may operate to provide power wirelessly to an electronic device 200 when the electronic device 200 is adjacent to or in contact with the base unit 100.

The base unit 100 includes a transmitter 110, a battery 120, and a controller 130. The transmitter 110 includes at least one transmitting coil 112 (interchangeably referred to as Tx coil). The transmitting coil 112 may include a magnetic core with conductive windings. The windings may include copper wire (also referred to as copper windings). In some examples, the copper wire may be monolithic copper wire (e.g., single-strand wire). In some examples, the copper wire may be multi-strand copper wire (e.g., Litz wire), which may reduce resistivity due to skin effect in some examples, which may allow for higher transmit power because resistive losses may be lower. In some examples, the magnetic core may be a ferrite core (interchangeably referred to as ferrite rod). The ferrite core may comprise a medium permeability ferrite, for example 78 material supplied by Fair-Rite Corporation. In some examples, the ferrite core may comprise a high permeability material, such as Vitroperm 500F supplied by Vacuumschmelze in Germany.

Ferrite cores comprising other ferrite materials may be used. In some examples, the ferrite may have a medium permeability of micro-i ($\mu$) of about 2300. In some examples, the ferrite may have permeability of micro-i ($\mu$) ranging from about 200 to about 5000. In some examples, different magnetic material may be used for the magnetic core. Generally, transmitting coils described herein may utilize magnetic cores which may in some examples shape the field provided by the transmitting coil, as the field lines preferentially go through the magnetic core, in this manner, partially guided flux may be used where a portion of the flux is guided by the magnetic core.

The transmitting coil 112 is configured to inductively couple to a receiving coil 212 in the electronic device 200. In some examples, the transmitter 110 may be additionally configured as a receiver and may thus be interchangeably referred to as transmitter/receiver. For example, the transmitting coil of the transmitter/receiver may additionally be configured as a receiving coil. In some examples, the transmitter/receiver may additionally include a receiving coil. In yet further examples, the base unit may include a separate receiver 140 comprising a receiving coil. The transmitter/receiver or separate receiver of the base unit may be configured to wirelessly receive power (102) and/or data (104) as will be further described below.

In some examples, the transmitter 110 may include a single transmitting coil 112. The transmitting coil 112 may be placed in an optimal location and/or orientation to provide an optimum charging zone 106. In some examples, the transmitting coil may be placed in a location within the base unit selected to provide a large number of charging opportunities during a typical use of the device. For example, the transmitting coil 112 may be placed near a side of the base unit which most frequently comes in proximity to an electronic device (e.g., a top side of a base unit implemented as a mobile phone case as illustrated in the example in FIG. 9).

In some examples, the transmitter 110 includes a plurality of transmitting coils 112. The transmitting coils 112 may be arranged in virtually any pattern. For example, the base unit may include a pair of coils which are angled to one another. In some examples, the coils may be arranged at angles smaller than 90 degrees, for example ranging between 15-75 degrees. In some examples, the coils may be arranged at 45 degrees relative to one another. Other combinations and arrangements may be used, examples of some of which will be further described below.

In some examples, the transmitting coils may be arranged to provide a nearly omnidirectional charging zone 106 (also referred to as charging sphere or hotspot). The charging zone 106 of the base unit may be defined by a three dimensional space around the base unit which extends a threshold distance from the base unit in all three directions (e.g., the x, y, and z directions). Although a three dimensions (3D) space corresponding to a charging range of the base unit may be referred to herein as a sphere, it will be understood that the three dimensions (3D) space corresponding to a charging range need not be strictly spherical in shape. In some examples, the charging sphere may be an ellipsoid or a different shape.

Efficiency of wireless power transfer within the charging zone 106 may be variable, for example, depending on a particular combination of transmitting and receiving coils and/or a particular arrangement of the coils or relative arrangements of the coils in the base unit and electronic device(s). The one or more transmitting coils 112 may be arranged within a housing of the base unit in a manner which improves the omni-directionality of the charging zone 106 and/or improves the efficiency of power transmission within the zone 106. In some examples, one or more transmitting coils 112 may be arranged within the housing in a manner which increases the opportunities for charging during typical use of the base unit. For example, the transmitting coil(s) may extend, at least partially, along one or more sides of the base unit which are most brought near an electronic device (e.g., the top or sides of a mobile phone case base unit which may frequently be moved in proximity with a wearable electronic device such as eyewear camera or a digital wrist watch). In some examples, the base unit may be placed on a surface (e.g., a table or desk) during typical use and electronic devices may be placed around the base unit. In such examples, the transmitting coil(s) may be arranged along a perimeter of the base unit housing.

In some examples, the base unit may be attached to a mobile phone via an attachment mechanism such as adhesive attachment, an elastic attachment, a spring clamp, suction cup(s), mechanical pressure, or others. In some examples, the base unit may be enclosed or embedded in an enclosure (also referred to as housing), which may have a generally planar shape (e.g., a rectangular plate). An attachment mechanism may be coupled to the housing such that the base unit may be removably attached to a mobile phone, a table, or other communication device. In an example, the attachment mechanism may be a biasing member, such as a clip, which is configured to bias the mobile phone towards the base unit in the form of, by way of example only, a rectangular plate. For example, a clip may be provided proximate a side of the base unit and the base unit may be attached to (e.g., clipped to) the mobile phone via the clip in a manner similar to attaching paper or a notebook/notepad to a clip board. In some examples, the base unit may be adhesively or elastically attached to the communication device and/or to a case of the communication device.

In further examples, the base unit may be separate from the communication device. In yet further examples, the base unit may be incorporated into (e.g., integrated into) the communication device. For example, the transmitter 110 may be integrated with other components of a typical mobile phone. The controller 130 may be a separate IC in the mobile phone or its functionality may be incorporated into the processor and/or other circuitry of the mobile phone. Typical mobile phones include a rechargeable battery which may also function as the battery 120 of the base unit. In this manner, a mobile phone may be configured to provide power wirelessly to electronic devices, such as separated electronic wearable devices.

As previously noted, the base unit 100 may include a battery 120. The battery 120 may be a rechargeable battery, such as a Nickel-Metal Hydride (NiMH), a Lithium ion (Li-ion), or a Lithium ion polymer (Li-ion polymer) battery. The battery 120 of the base unit 100 may include larger amount of energy capacity as compared to a battery of the electronic device 200. That is, the battery 120 may store more power, and in some examples, significantly more power than a battery onboard the electronic device (e.g., the battery 1220 of wearable camera 1200). The electronic device, which may be a wearable device, may have a significantly smaller form factor than the base unit 100 and accordingly, may be able to accommodate a much smaller battery. Periodic wireless transfer of power from the base unit to the electronic device (e.g., when the electronic device is within the charging range of the base unit) may enable a small form factor suitable for a wearable electronic device without significant sacrifice in performance. The battery 120 may be coupled to other components to receive power. For example, the battery 120 may be coupled to an energy generator 150. The energy generator 150 may include an energy harvesting device which may provide harvested energy to the battery for storage and use in charging the electronic device(s). Energy harvesting devices may include, but not be limited to, kinetic-energy harvesting devices, solar cells, thermoelectric generators, or radio-frequency harvesting devices. In some examples, the battery 120 may be coupled to an input/output connector 180 such as a universal serial bus (USB) port. It will be understood that the term USB port herein includes any type of USB interface currently known or later developed, for example mini and micro USB type interfaces. Other types of connectors, currently known or later developed, may additionally or alternatively be used. The I/O connector 180 (e.g., USB port) may be used to connect the base unit 100 to an external device, for example an external power source or a computing device (e.g., a personal computer, laptop, tablet, or a mobile phone).

The transmitter 110 is operatively coupled to the battery 120 to selectively receive power from the battery and wirelessly transmit the power to the electronic device 200. As described herein, in some examples, the transmitter may combine the functionality of transmitter and receiver. In such examples, the transmitter may also be configured to wirelessly receive power from an external power source. It will be understood that during transmission, power may be wirelessly broadcast by the transmitter and may be received by any receiving devices within proximity (e.g., within the broadcast distance of the transmitter).

The transmitter 110 may be weakly-coupled to a receiver in the electronic device 200 in some examples. There may not be a tight coupling between the transmitter 110 and the receiver in the electronic device 200. Highly resonant coupling may be considered tight coupling. The weak (or loose) coupling may allow for power transmission over a distance (e.g. from a base unit in or on a mobile phone to a wearable device on eyewear or from a base unit placed on a surface to a wearable device placed on the surface in a neighborhood of, but not on, the base unit). So, for example, the transmitter 110 may be distance separated from the receiver. The distance may be greater than 1 mm in some examples, greater than 10 mm in some examples, greater than 100 mm in some examples, and greater than 1000 mm in some examples. Other distances may be used in other examples, and power may be transferred over these distances.

The transmitter 110 and the receiver in the electronic device 200 may include impedance matching circuits each having an inductance, capacitance, and resistance. The impedance matching circuits may function to adjust impedance of the transmitter 110 to better match impedance of a receiver under normal expected loads, although in examples described herein the transmitter and receiver may have transmit and receive coils, respectively, with different sizes and/or other characteristics such that the impedance of the receiver and transmitter may not be matched by the impedance matching circuits, but the impedance matching circuits may reduce a difference in impedance of the transmitter and receiver. The transmitter 110 may generally provide a wireless power signal which may be provided at a body-safe frequency, e.g. less than 500 kHz in some examples, less than 300 kHz in some examples, less than 200 kHz in some examples, 125 kHz in some examples, less than 100 kHz in some examples, although other frequencies may be used.

Transmission/broadcasting of power may be selective in that a controller controls when power is being broadcast. The base unit may include a controller 130 coupled to the battery 120 and transmitter 110. The controller 130 may be configured to cause the transmitter 110 to selectively transmit power, as will be further described. A charger circuit may be connected to the battery 120 to protect the battery from overcharging. The charger circuit may monitor a level of charge in the battery 120 and turn off charging when it detects that the battery 120 is fully charged. The functionality of the charger circuit may, in some examples, be incorporated within the controller 130 or it may be a separated circuit (e.g., separate IC chip).

In some examples, the base unit may include a memory 160. The memory 160 may be coupled to the transmitter 110 and/or any additional transmitters and/or receivers (e.g., receiver 140) for storage of data transmitted to and from the base unit 100. For example, the base unit 100 may be configured to communicate data wirelessly to and from the electronic device 200, e.g., receive images acquired with an electronic device in the form of a wearable camera, or transmit executable instructions, configuration data, or other data to the electronic device. The base unit 100 may include larger amount of memory as compared to the electronic device 200. That is, the memory 160 may be configured to store more data, and in some examples, significantly more data than a memory device onboard the electronic device (e.g., the memory 1240 of wearable camera 1200). The electronic device, which may be a wearable device, may have a significantly smaller form factor than the base unit and accordingly, may be able to accommodate a much smaller memory device. Periodic wireless transfer of data from the electronic device to the base unit (e.g., when the electronic device is within range of the base unit such as during charging) may enable a small form factor suitable for a wearable electronic device without significant sacrifice in performance. The base unit may include one or more sensors 170, which may be operatively coupled to the controller. A sensor 170 may detect a status of the base unit such that the transmitter may provide power selectively and/or adjustably under control from controller 130.

Figure 6:
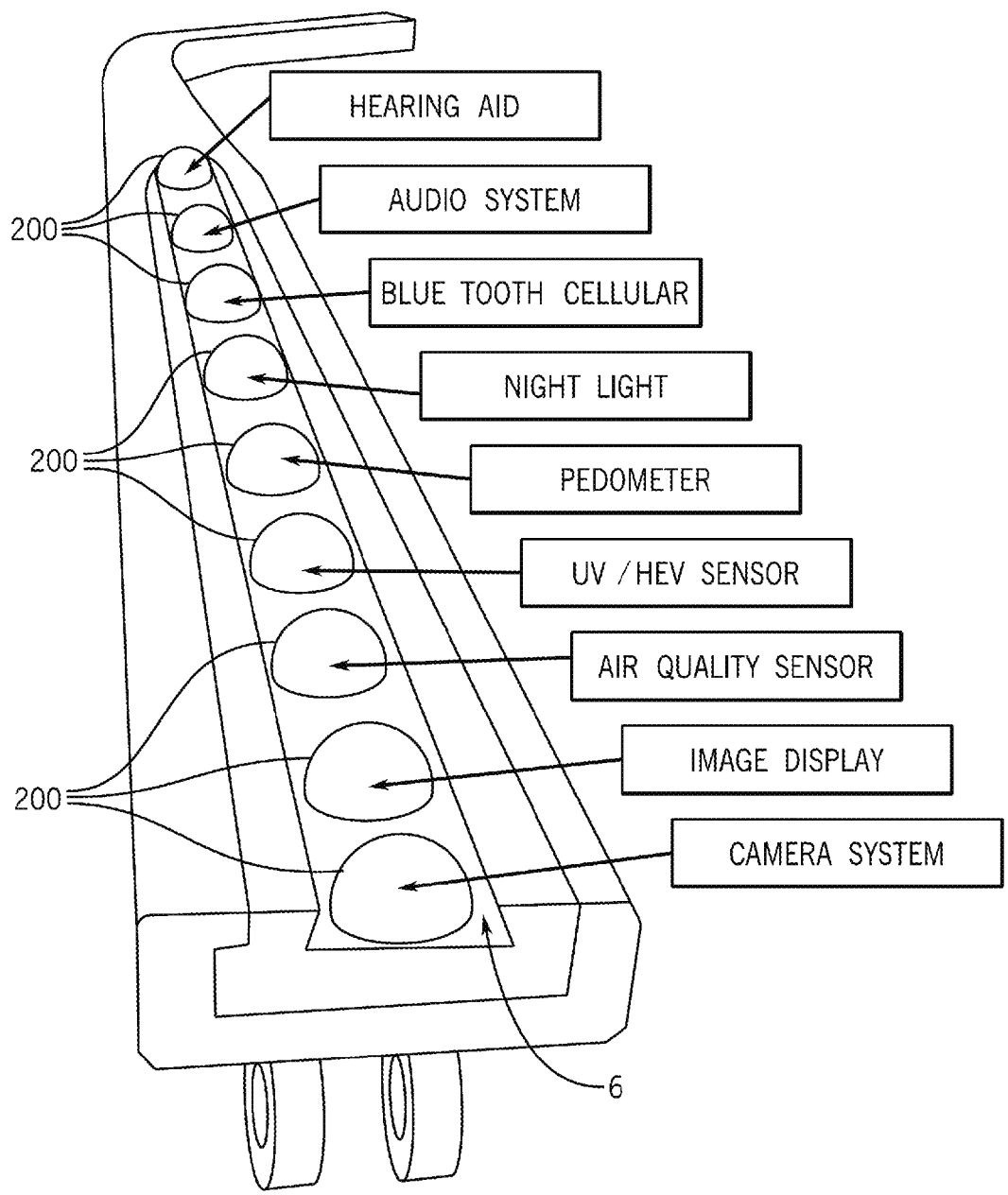
FIG. 6 illustrates examples of electronic devices attached to eyewear in accordance with the present disclosure.

The electronic device 200 may be configured to provide virtually any functionality, for example an electronic device configured as a camera (e.g., camera 1200). In this regard, the electronic device 200 may include circuitry associated with wireless charging. For example, the electronic device 200 may include a receiving which may include at least one receiving coil 212. As described, the receiving coil 212 may be coupled to a rechargeable power cell onboard the electronic device 200. Frequent charging in a manner that is non-invasive or minimally invasive to the user during typical use of the electronic device may be achieved via wireless coupling between the receiving and transmitting coils in accordance with the examples herein. In some examples, the electronic device may be a wearable electronic device, which may interchangeably be referred to herein as electronic wearable devices (e.g., wearable camera). The electronic device may have a sufficiently small form factor to make it easily portable by a user. The electronic device 200 may be attachable to clothing or an accessory worn by the user, for example eyewear. For example, the electronic device 200 may be attached to eyewear using a guide 6 (e.g., track) incorporated in the eyewear, e.g., as illustrated in FIG. 6 (only a portion of eyewear, namely the temple, is illustrated so as not to clutter the drawing). FIG. 6 shows examples of electronic devices 200 which may be configured to receive power wirelessly in accordance with the present disclosure. In some examples, the electronic device 200 may be a miniaturized camera system which may, in some examples, be attached to eyewear. In other examples, the electronic device may be any other type of an electronic system attached to eyewear, such as an image display system, an air quality sensor, a UV/HEV sensor, a pedometer, a night light, a blue tooth enabled communication device such as blue tooth headset, a hearing aid or an audio system. In some examples, the electronic device may be worn elsewhere on the body, for example around the wrist (e.g., an electronic watch or a biometric device, such as a pedometer). The electronic device 200 may be another type of electronic device other than the specific examples illustrated. The electronic device 200 may be virtually any miniaturized electronic device, for example and without limitation a camera, image capture device, IR camera, still camera, video camera, image sensor, repeater, resonator, sensor, sound amplifier, directional microphone, eyewear supporting an electronic component, spectrometer, directional microphone, microphone, camera system, infrared vision system, night vision aid, night light, illumination system, sensor, pedometer, wireless cell phone, mobile phone, wireless communication system, projector, laser, holographic device, holographic system, display, radio, GPS, data storage, memory storage, power source, speaker, fall detector, alertness monitor, geo-location, pulse detection, gaming, eye tracking, pupil monitoring, alarm, CO sensor, CO detector, CO2 sensor, CO2 detector, air particulate sensor, air particulate meter, UV sensor, UV meter, IR sensor IR meter, thermal sensor, thermal meter, poor air sensor, poor air monitor, bad breath sensor, bad breath monitor, alcohol sensor, alcohol monitor, motion sensor, motion monitor, thermometer, smoke sensor, smoke detector, pill reminder, audio playback device, audio recorder, speaker, acoustic amplification device, acoustic canceling device, hearing aid, assisted hearing assisted device, informational earbuds, smart earbuds, smart ear-wearables, video playback device, video recorder device, image sensor, fall detector, alertness sensor, alertness monitor, information alert monitor, health sensor, health monitor, fitness sensor, fitness monitor, physiology sensor, physiology monitor, mood sensor, mood monitor, stress monitor, pedometer, motion detector, geo-location, pulse detection, wireless communication device, gaming device, eyewear comprising an electronic component, augmented reality system, virtual reality system, eye tracking device, pupil sensor, pupil monitor, automated reminder, light, alarm, cell phone device, phone, mobile communication device, poor air quality alert device, sleep detector, doziness detector, alcohol detector, thermometer, refractive error measurement device, wave front measurement device, aberrometer, GPS system, smoke detector, pill reminder, speaker, kinetic energy source, microphone, projector, virtual keyboard, face recognition device, voice recognition device, sound recognition system, radioactive detector, radiation detector, radon detector, moisture detector, humidity detector, atmospheric pressure indicator, loudness indicator, noise indicator, acoustic sensor, range finder, laser system, topography sensor, motor, micro motor, nano motor, switch, battery, dynamo, thermal power source, fuel cell, solar cell, kinetic energy source, thermo electric power source, smart band, smart watch, smart earring, smart necklace, smart clothing, smart belt, smart ring, smart bra, smart shoes, smart footwear, smart gloves, smart hat, smart headwear, smart eyewear, and other such smart devices. In some examples, the electronic device 200 may be a smart device. In some examples, the electronic device 200 may be a micro wearable device or an implanted device.

The electronic device 200 may include a receiver (e.g., Rx coil 212) configured to inductively couple to the transmitter (e.g. Tx coil 112) of the base unit 100. The receiver may be configured to automatically receive power from the base unit when the electronic device and thus the receiver is within proximity of the base unit (e.g., when the electronic device is a predetermined distance, or within a charging range, from the base unit). The electronic device 200 may store excess power in a power cell onboard the electronic device. The power cell onboard the electronic device may be significantly smaller than the battery of the base unit. Frequent recharging of the power cell may be effected by virtue of the electronic device frequently coming within proximity of the base unit during normal use. For example, in the case of a wearable electronic device coupled to eyewear and a base unit in the form of a cell phone case, during normal use, the cell phone may be frequently brought to proximity of the user's head to conduct phone calls during which times recharging of the power cell onboard the wearable electronic device may be achieved. In some examples, in which the wearable electronic device comprises an electronic watch or biometric sensor coupled to a wrist band or a arm band, the wearable electronic device may be frequently recharged by virtue of the user reaching for their cellphone and the base unit in the form of a cell phone case coming within proximity to the wearable electronic device. In some examples, the electronic device may include an energy harvesting system.

In some examples, the electronic device 200 may not include a battery and may instead be directly powered by wireless power received from the base unit 100. In some examples, the electronic device 200 may include a capacitor (e.g., a supercapacitor or an ultracapacitor) operatively coupled to the Rx coil 212.

Typically in existing systems which apply wireless power transfer, transmitting and receiving coils may have the same or substantially the same coil ratios. However, given the smaller form factor of miniaturized electronic devices according to the present disclosure, such implementation may not be practical. In some examples herein, the receiving coil may be significantly smaller than the transmitting coils, e.g., as illustrated in FIG. 7. In some examples, the Tx coil 112 may have a dimension (e.g., a length of the wire forming the windings 116, a diameter of the wire forming the windings 116, a diameter of the coil 112, a number of windings 116, a length of the core 117, a diameter of the core 117, a surface area of the core 117) which is greater, for example twice or more, than a respective dimension of the Rx coil 212 (e.g., a length of the wire forming the windings 216, a diameter of the coil 212, a number of windings 216, a length of the core 217, a surface area of the core 217). In some examples, a dimension of the Tx coil 112 may be two times or greater, five times or greater, 10 times or greater, 20 times or greater, or 50 times or greater than a respective dimension of the Rx coil 212. In some examples, a dimension of the Tx coil 112 may be up to 100 times a respective dimension of the Rx coil 212. For example, the receiving coil 212 (Rx coil) may comprise conductive wire having wire diameter of about 0.2 mm. The wire may be a single strand wire. The Rx coil in this example may have a diameter of about 2.4 mm and a length of about 13 mm. The Rx coil may include a ferrite rod having a diameter of about 1.5 mm and a length of about 15 mm. The number of windings in the Rx coil may be, by way of example only, approximately 130 windings. The transmitting coil 112 (Tx coil) may comprise a conductive wire having a wire diameter of about 1.7 mm. The wire may be a multi-strand wire.

The Tx coil in this example may have a diameter of about 14.5 mm and a length of about 67 mm. The Tx coil may include a ferrite rod having a diameter of about 8 mm and a length of about 68 mm. Approximately 74 windings may be used for the Tx coil. Other combinations may be used for the Tx and Rx coils in other examples, e.g., to optimize power transfer efficiency even at distances in excess of approximately 30 cm or more. In some examples, the transfer distance may exceed 12 inches. In some examples herein, the Tx and Rx coils may not be impedance matched, as may be typical in conventional wireless power transfer systems. Thus, in some examples, the Tx and Rx coils of the base unit and electronic device, respectively, may be referred to as being loosely-coupled. According to some examples, the base unit is configured for low Q factor wireless power transfer. For example, the base unit may be configured for wireless power transfer at Q factors less than 500 in some examples, less than 250 in some examples, less than 100 in some examples, less than 80 in some examples, less than 60 in some examples, and other Q factors may be used. While impedance matching is not required, examples in which the coils are at least partially impedance matched are also envisioned and within the scope of this disclosure. While the Tx and Rx coils in wireless powers transfer systems described herein may be typically loosely coupled, the present disclosure does not exclude examples in which the Tx and Rx coils are impedance matched.

The receiving coil (e.g., Rx coil 212) may include conductive windings, for example copper windings. Conductive materials other than copper may be used. In some examples, the windings may include monolithic (e.g., single-strand) or multi-strand wire. In some examples, the core may be a magnetic core which includes a magnetic material such as ferrite. The core may be shaped in the form of a rod. The Rx coil may have a dimension that is smaller than a dimension of the Tx coil, for example a diameter, a length, a surface area, and/or a mass of the core (e.g., rod) may be smaller than a diameter, a length, a surface area, and/or a mass of the core (e.g., rod) of the Tx coil. In some examples, the magnetic core (e.g., ferrite rod) of the Tx coil may have a surface area that is two times greater or more than a surface area of the magnetic core (e.g., ferrite rod) of the Rx coil. In some examples, the Tx coil may include a larger number of windings and/or a greater length of wire in the windings when unwound than the number or length of wire of the windings of the Rx coil. In some examples, the length of unwound wire of the Tx coil may be at least two times the length of unwound wire of the Rx coil.

In some examples, an Rx coil 212 may have a length from about 10 mm to about 90 mm and a radius from about 1 mm to about 15 mm. In one example, the performance of an Rx coil 212 having a ferrite rod 20 mm in length and 2.5 mm in diameter with 150 conductive windings wound thereupon was simulated with a Tx coil 112 configured to broadcast power at frequency of about 125 KHz. The Tx coil 112 included a ferrite rod having a length of approximately 67.5 mm and a diameter of approximately 12 mm. Up to 20% transmission efficiency was obtained in the aligned orientation at distances of up to 200 mm between the coils. Some improvement was observed in the performance when the coils were arranged in a parallel orientation, in which the Rx coil continued to receive transmitted power until a distance of about 300 mm. Examples of a wireless energy transfer system according to the present disclosure were compared with efficiency achievable by a system configured in accordance with the Qi 1.0 standard. The size of the Tx coil in one simulated system was 52 mm×52 mm×5.6 mm and a size of one Rx coil simulated was 48.2 mm×32.2 mm×1.1 mm, and load impedance was 1 KOhm.

Figure 8:
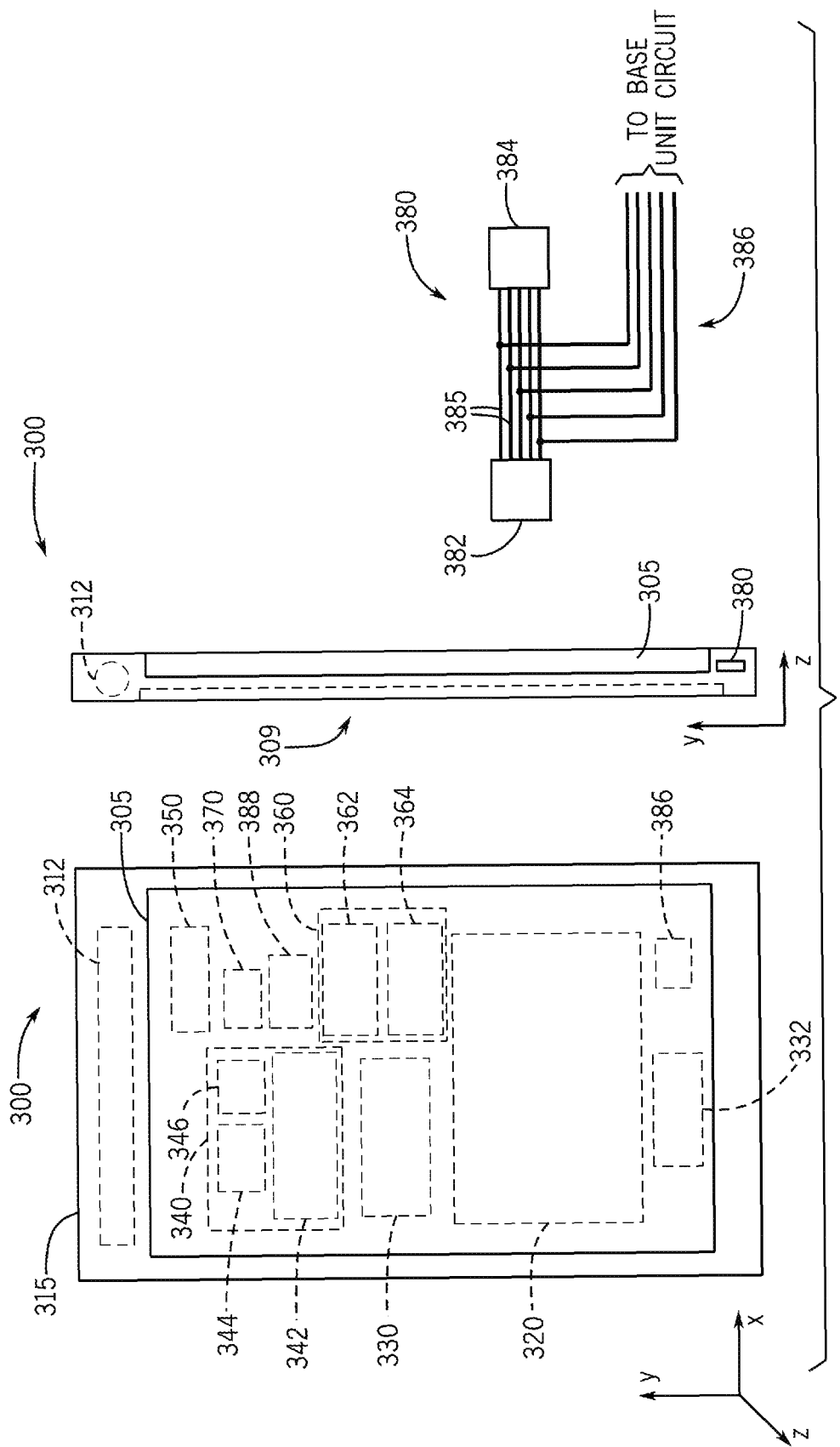
FIG. 8 illustrates a block diagram of a base unit implemented in the form of a mobile phone case form factor according to examples of the present disclosure.
Figure 9:
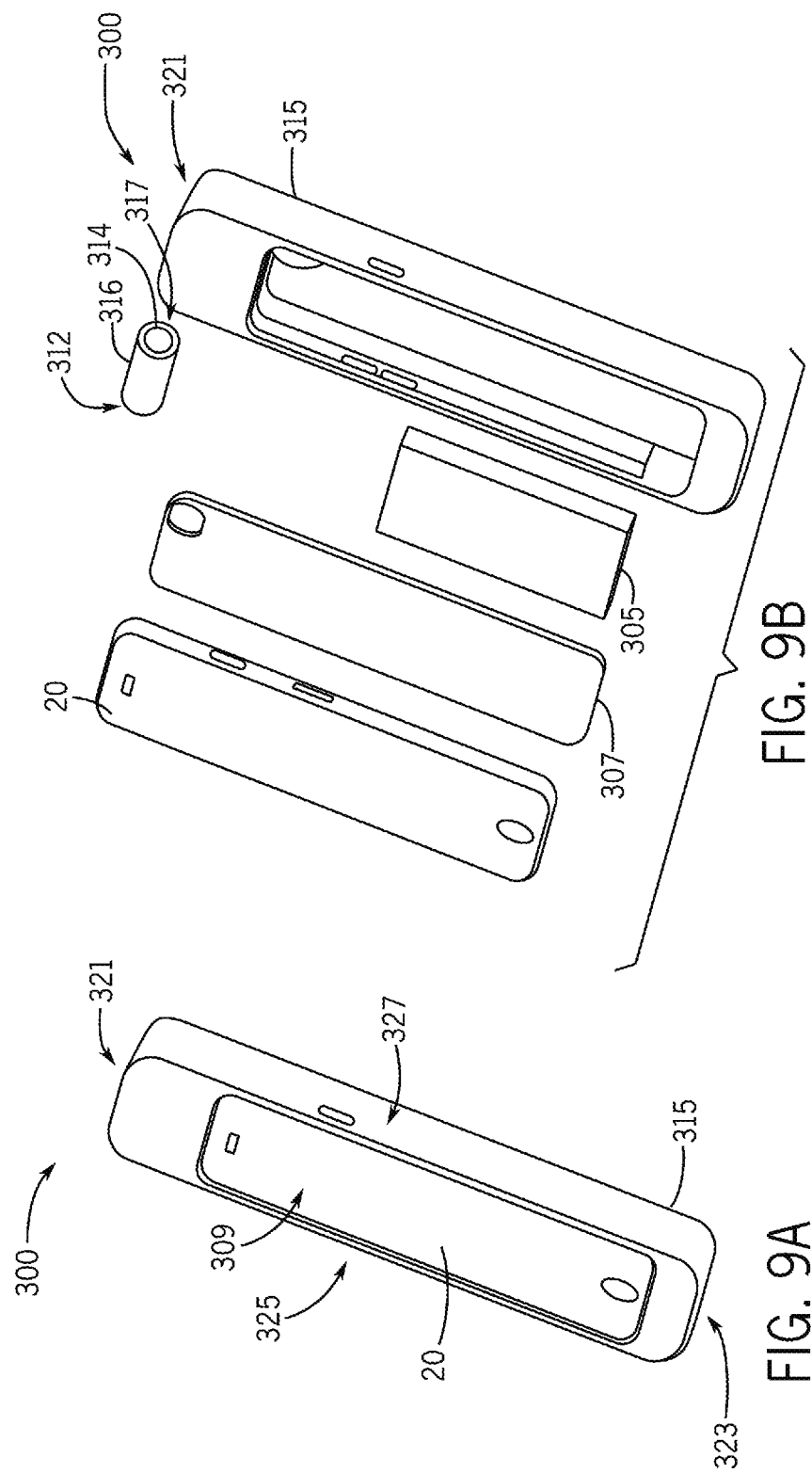
FIGS. 9A and 9B illustrate isometric and exploded isometric views of a base unit implemented as a mobile phone case according to further examples of the present disclosure.

Referring now also to FIGS. 8-9, a base unit 300, which may be incorporated in a mobile phone case form factor as shown in FIGS. 9A and 9B, will be described. The base unit 300 may include some or all of the components of base unit 100 described above with reference to FIG. 5. For example, the base unit 300 may include a transmitting coil 312 (also referred to as Tx coil). The transmitting coil 312 is coupled to an electronics package 305, which includes circuitry configured to perform the functions of a base unit in accordance with the present disclosure, including selectively and/or adjustably providing wireless power to one or more electronic devices. In some examples, the electronic device may be an electronic device which is separated from the base unit (e.g., camera 1200). In some examples, the electronic device may be the mobile phone 20, to which the base unit 300 in the form of a case is attached.

The base unit 300 may provide a mobile wireless hotspot (e.g., charging sphere 106) for wirelessly charging electronic devices that are placed or come into proximity of the base unit (e.g., within the charging sphere). As will be appreciated, the base unit 300 when implemented in the form of a mobile phone case may be attached to a mobile phone and carried by the user, thus making the hotspot of wireless power mobile and available to electronic devices wherever the user goes. In examples, the base unit may be integrated with the mobile phone. The hotspot of wireless power by virtue of being connected to the user's mobile phone, which the user often or always carries with him or her, thus advantageously travels with the user. As will be further appreciated, opportunities for recharging the power cell on an electronic device worn by the user are frequent during the normal use of the mobile phone, which by virtue of being use may frequently be brought into the vicinity of wearable devices (e.g., eyewear devices when the user is making phone calls, wrist worn devices when the user is browsing or using other function of the mobile phone).

The Tx coil 312 and electronics (e.g., electronics package 305) may be enclosed in a housing 315. The housing 315 may have a portable form factor. In this example, the housing is implemented in the form of an attachment member configured to be attached to a communication device such as a mobile phone (e.g., a mobile phone, a cellular phone, a smart phone, a two-way radio, a walkie-talkie, and the like), a tablet or the like. In this regard, the housing 315 of the base unit may be implemented as a mobile phone/tablet case or cover. The housing 315 may include features for mechanically engaging the communication device (e.g., mobile phone 20). In further examples, the housing of the base unit may be implemented as an attachment member adapted to be attached to an accessory, such as a handbag, a belt, or others. Other form factors may be used. The base unit 300 may power an electronic device other than the communication device to which it is connected, for example the camera 1200.

In the examples in FIGS. 8 and 9, the base unit 300 includes a transmitting coil 312. The transmitting coil 312 includes a magnetic core 317 with conductive windings 316. The core 317 may be made of a ferromagnetic material (e.g., ferrite), a magnetic metal, or alloys or combinations thereof, collectively referred to herein as magnetic material. For example, a magnetic material such as ferrite and various alloys of iron and nickel may be used. The coil 312 includes conductive windings 316 provided around the core 317. It will be understood in the context of this disclosure that the windings 316 may be, but need not be, provided directly on the core 317. In other words, the windings 316 may be spaced from the core material which may be placed within a space defined by the windings 316. In some examples, improved performance may be achieved by the windings being wound directly onto the core as in the present example.

The core 317 may be shaped as an elongate member and may have virtually any cross section, e.g., rectangular or circular cross section. An elongate core may interchangeably be referred to as a rod 314, e.g., a cylindrical or rectangular rod. The term rod may be used to refer to an elongate core in accordance with the present application, regardless of the particular cross sectional shape of the core. The core may include a single rod or any number of discrete rods (e.g., 2, 3, 4, 5, 6, 7, 8, 9, 10 or any other number greater than 10) arranged in patterns as will be described. In the examples in FIGS. 8 and 9, without limitation, the transmitting coil comprises a single cylindrical rod positioned at least partially along a first side (e.g., top side 321) of the housing 315. In other examples, one or more coils may alternatively or additionally be positioned along other sides, e.g., a bottom side 323, the left side 325 and/or right sides 327 of the housing 315.

The electronics package 305 (interchangeably referred to as electronics or circuitry) may be embedded in the housing 315 or provided behind a cover 307. In some examples, the cover 307 may be removable. In some examples, it may be advantageous to replace the battery 320. In such examples, the battery 320 may be a separable component from the remaining circuitry. The battery 320 may be accessed by removing the cover 307. In some examples, the electronics package 305 may include a battery for storing energy from an external power source. In some examples, the base unit 300 may alternatively or additionally receive power from the mobile phone when powering the distance separated electronic device. In some examples, the base unit may not require a battery, and even smaller form factors may thus be achieved.

The base unit may be provided with one or more I/O devices 380. I/O devices may be used to receive and/or transmit power and/or data via a wired connection between the base unit and another device. For example, the base unit may include an I/O device 380 in the form of a USB connector. The I/O device 380 (e.g., USB connector) may include a first connection side 382 (e.g., a female port) for coupling the base unit to external devices (e.g., a power source such as the power grid and/or another electronic device). The I/O device 380 may include a second connection side 384 (e.g., a male connector) for coupling the base unit to the mobile phone, e.g., via a USB port of the mobile phone. One or more of the signal lines 385 of the I/O device may be coupled to power, ground, and/or data lines in the base unit circuitry. For example, if a USB connector with 5 lines is used, 2 lines may be used for data, 2 lines may be used for power, and 1 line may be coupled to ground or used for redundancy. The signal lines 385 of the first and second connection sides may be coupled to the base unit circuitry via a connector circuit 386 (e.g., USB chip). It will be understood that any other type of connectors may be used, for example, and without limitation, an APPLE Lightning connector.

The base unit 300 may include a controller 330. The controller 330 may include functionality for controlling operations of the base unit 300, for example controlling detection of electronic devices (e.g., a camera 1200) within proximity, selective transmission of wireless power upon detection of an electronic device, determination of status of the base unit, and selection of transmission mode depending on the status of the base unit. These functions may be implemented in computer readable media or hardwired into an ASIC or other processing hardware. The controller 330 may interchangeably be referred to as base unit processor.

The base unit may include one or more memory devices 360. The base unit may include volatile memory 362 (e.g., RAM) and non-volatile memory 364 (e.g., EEPROM, flash or other persistent electronic storage). The base unit may be configured to receive data (e.g. user data, configuration data) through wired or wireless connection with external electronic devices and may store the data on board the base unit (e.g., in one or more of the memory devices 360). The base unit may be configured to transmit data stored onboard the base unit to external electronic devices as may be desired. In addition to user data, the memory devices may store executable instructions which, when executed by a processor (e.g., processor 360), cause the base unit to perform functions described herein.

The base unit 300 may include a charger circuit 332, which may be configured to protect the battery 320 from overcharging. The charger circuit may be a separate chip or may be integrated within the controller 330. The base unit may include a separate transmitter/receiver circuitry 340 in addition to the Tx coil 312 used for wireless power transmission. The transmitter/receiver circuitry 340 may include a receiving/transmitting coil 342, e.g., an RF coil. The transmitter/receiver circuitry 340 may further include driver circuitry 344 for transmission (e.g., RF driver circuit) and sense circuitry 346 for reception of signals (e.g., RF sensing circuit). The base unit 300 may include additional circuitry for wireless communication (e.g., communication circuit 388). The communication circuit 388 may include circuitry configured for Bluetooth or WiFi communication. In some examples, the base unit 300 may include one or more sensor 370 and/or one or more energy generators 350 as described herein. Additional circuitry providing additional functionality may be included. For example, the base unit 300 may include an image processor for processing and/or enhancement of images received from a wearable camera (e.g., eyewear camera). The image processing functionality may be provided in a separate IC (e.g., a DaVinci chip set) or it may be incorporated in a processor which implements the functions of controller 330.

In some examples, the housing may be configured to be mechanically coupled to a communication device, such as a mobile phone. For example, the housing 315 may be configured to provide the functionality of a mobile phone case. The housing 315 may have a shape corresponding to a shape of a communication device (e.g., a mobile phone). For example, the housing 315 may be generally rectangular in shape and may be sized to receive, at least partially, or enclose, at least partially, the communication device. In some examples, the housing 315 may be configured to cover only one side of the communication device. In some examples, the housing 315 may cover at least partially two or more sides of the communication device. The housing 315 may include a receptacle 309 configured to receive and/or retain the mobile phone at least partially therein. The receptacle 309 may be on a front side of the housing 315. The base unit electronics may be provided proximate an opposite side of the receptacle. The coils may be placed around the perimeter of the housing, e.g. along any of the top, bottom, or left and right sides.

In some examples, the transmitter includes a plurality of discrete Tx coils (for example 2, 3, 4, 5, 6, 7, 8, 9 or 10 coils), each having a magnetic core with conductive windings wound thereon. At least some of the Tx coils may be at an angle to one another, for example at 20 degrees or more, 30 degrees or more, 45 degrees or more, 75 degrees or more relative to one another. In some examples, the Tx coils may be generally perpendicular to one another. In some examples, two or more Tx coils may be generally parallel to one another. In some examples, two or more Tx coils may be disposed along a same edge of the housing. A diameter ø of the Tx coils may range from about 5 mm to about 20 mm. In some examples, the diameter ø of the Tx coils may be between 8 mm to 15 mm. In some examples, the diameter ø of the Tx coils may be 9 mm, 10 mm, 11 mm, 12 mm, 13 mm, or 14 mm. Different diameters for the coils may be used. In some examples, the magnetic core may be an elongate cylindrical rod made from a magnetic material. In some examples, the rods may be arranged around the perimeter of the base unit's housing. In some examples, the rods may extend substantially along the full length of a top side, bottom side, left and/or right sides of the housing. Lengths (l), widths (w), and thicknesses (t) of the housing may vary depending on dimensions of the communication device, which the housing is configured to attach to. In some examples, the housing may range from about 150 mm-180 mm, 80-95 mm, and 15-25 mm, respectively. Other lengths, widths, and thicknesses may be used, e.g., to accommodate a given communication device (e.g. smartphone) and/or accommodate a particular coil size. In some examples, the housing may be configured to attach to an IPHONE brand mobile phone or a SAMSUNG brand mobile phone. For example, a housing configured to attach to an IPHONE 6 mobile phone may be about 160 mm long, about 84 mm wide, and about 19 mm thick and accommodate Tx coils having a diameter of about 9 mm. In another example, the housing may have a length of about 165 mm, a width of about 94 mm, and a thickness of about 21 mm accommodating a coil having a diameter of about 14 mm. In some examples, the housing may be configured to attach to an IPAD brand tablet or a SAMSUNG brand tablet. In some examples, the housing may be configured to engage one, two, three and/or all of the perimeter sides of the communication device. In some examples, the base unit housing may be configured to cover or partially cover one or more of the communication devices' major sides (e.g., the display side or the back side) of the communication device.

Figure 10:
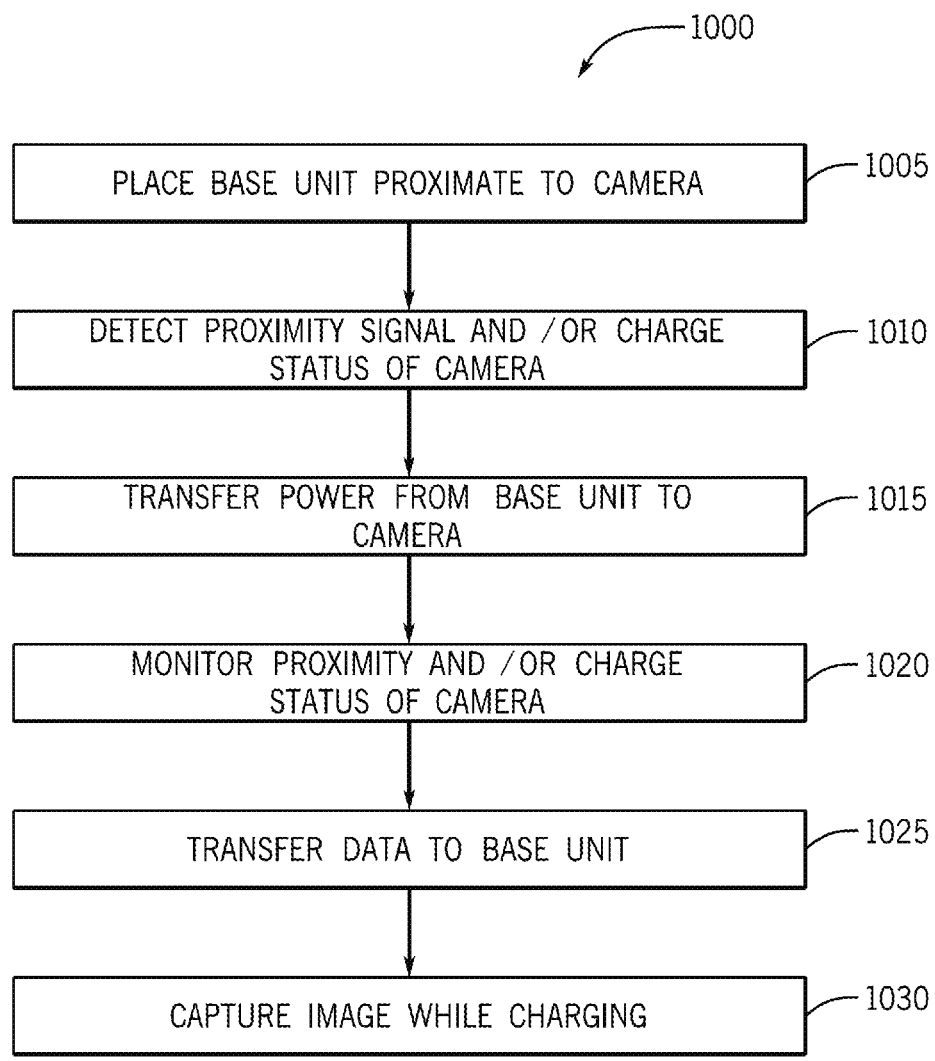
FIG. 10 illustrates a flow chart of a process according to some examples herein.

FIG. 10 shows a flow diagram of a process in accordance with the present disclosure. The process 1000 may include placing a base unit (e.g., base unit 100) proximate a camera (e.g., camera 1200), as show in block 1005. The camera may be a wearable camera, which may be attached to eyewear 4, for example via a guide on the camera engaging a track on the eyewear 4, as illustrated in FIG. 11. The base unit (e.g., base unit 100) may be attached to a communication device, such as a mobile phone. The base unit may include a transmitting coil configured to inductively couple with a receiving coil in the camera to wirelessly transmit power to the wearable camera. The process 1000 may further include detecting the wearable camera with the base unit. For example, the base unit may detect a proximity signal of the camera, as shown in block 1010. In some examples, the base unit may alternatively or additionally detect a charge status signal of the camera, as further shown in block 1010. The charge status signal may be indicative of a charge status of the camera's power cell (e.g., battery 1220 of camera 1200). The process 1000 may also include wirelessly transmitting power from the base unit to the camera, as shown in block 1015. The wireless transfer of power may continue while the camera remains within a charging range of the base unit (e.g., based on a detected proximity signal) or until a charge state signal of the camera corresponds to a fully charged state of the camera. In some examples, the base unit may be configured to broadcast wireless power only if a charge status of an electronic device in proximity indicates a less than full charge of the electronic device's onboard battery. To that end, the base unit may monitor the proximity and/or charge status of the camera, as shown in block 1020.

In some examples, the camera may be configured to selectively receive power. In other words, circuitry associated with wireless power charging may be selectively activated responsive to an indication of proximity of an appropriately tuned wireless power transmitter. The base unit may be configured to broadcast power and the camera may be configured to receive power broadcast at body-safe levels. The base unit may be configured to broadcast power and the camera may be configured to receive power broadcast at a frequency within the range of 50 kHz or 500 kHz. The camera may broadcast a signal (e.g., proximity signal, charge status signal), which may be detected by the base unit. Upon detecting of the camera in proximity the base unit may begin broadcasting power signals and the camera may activate circuitry associated with wireless power reception (e.g., a charging circuit of the camera). In some examples, the camera may broadcast a signal (e.g., proximity signal, charge status signal) responsive to an interrogation signal from the base unit and the base unit may automatically detect the broadcast signal from the camera and/or automatically initiate power transmission upon the detection of the signal from the camera.

In some examples, the process 1000 may include capturing an image with the camera and/or transfer data (e.g., images) wirelessly, as shown in block 1025. Images may be captured responsive to a command, which may be generated responsive to manual user input (e.g., via a trigger button on the camera). In some examples, images may be captured responsive to a command generated by the controller responsive to an audible command detected by the camera. For example, the camera may include a microphone (e.g., microphone 1268), which is configured to detect an audible command, which may include a voice command or other speech or non-speech sounds (a click of the user's teeth). The camera may be configured to capture images while receiving wireless power, e.g., as shown in block 1030. Captured images may be stored onboard the camera (e.g., in a memory 1240) or transferred to another electronic device, such as the base unit or a computer system 1410. Images or other data may be transferred wirelessly from the camera to the base unit or to another computing device (e.g., computer system 1410 in FIG. 14) automatically or responsive to user input. To that end, the camera may include wireless communication devices (e.g., Wi-Fi, Bluetooth, or the like). In some examples, the wireless receiver of the camera (e.g., receiver 1230) may also be configured as a transmitter operable to transmit data (e.g., images) from the camera to the base unit or another computing device.

Figure 12:
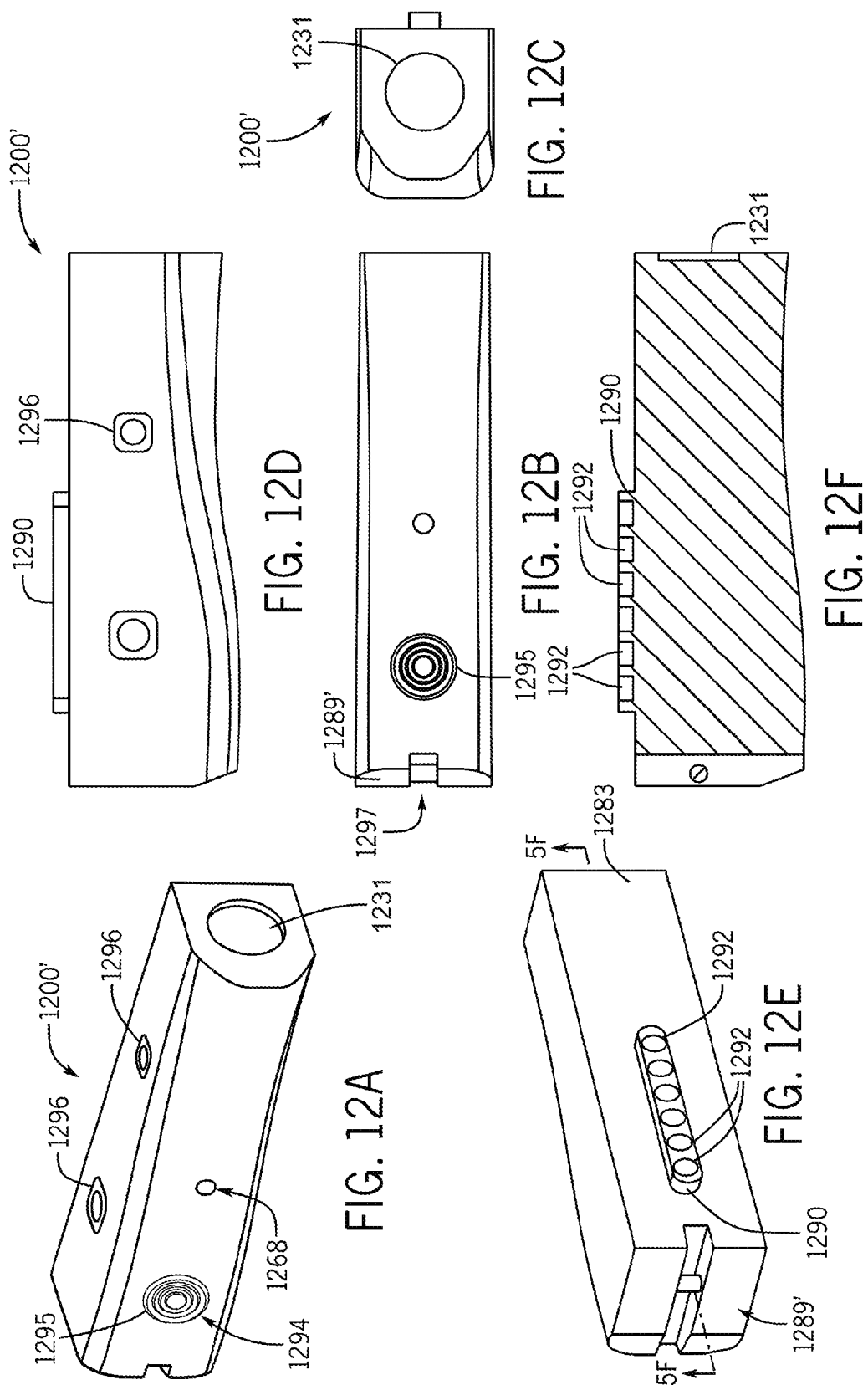
FIG. 12A-F illustrate views of a camera in accordance with further examples herein.
Figure 13:
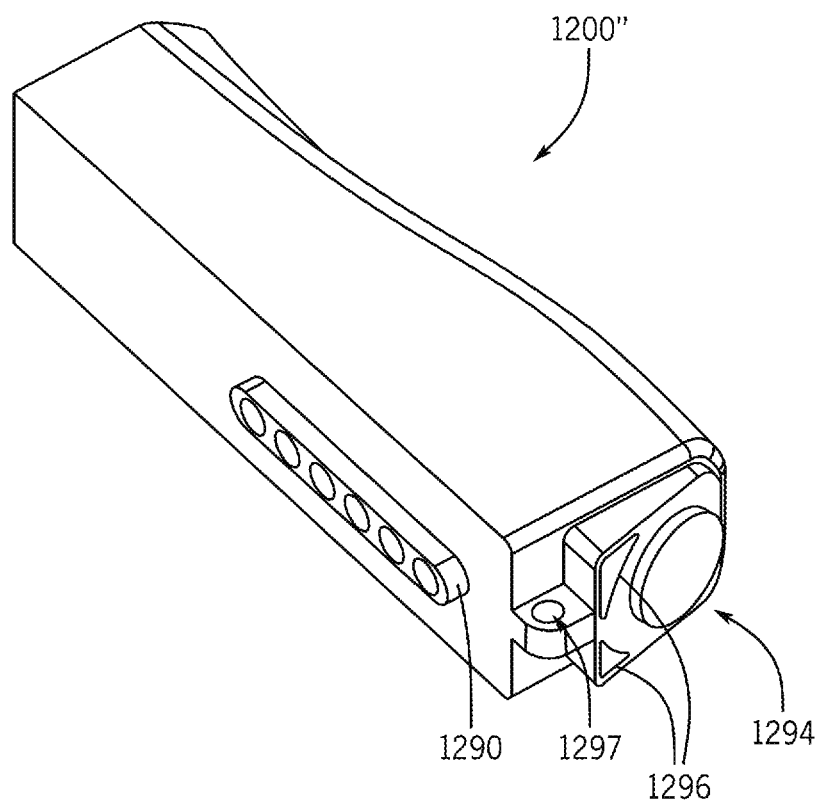
FIG. 13 illustrates an isometric view of a camera in accordance with yet further examples herein.

Referring now also to FIGS. 12-13, additional features of cameras in accordance with the present disclosure will be described. As described, the camera 1200', 1200" may be a wearable camera and may include a guide 1290. The guide 1290 may include one or more magnets 1292 for magnetically attaching the camera to the eyewear. The one or more magnets may be embedded in the guide 1290. The guide 1290 may be provided along a bottom side 1283 (also referred to as a base 1283) of the camera 1200', 1200". The guide 1290 may be implemented as a protrusion (also referred to as male rail or simply rail) which is configured for a cooperating sliding fit with a groove (also referred to as female track or simply track) on the eyewear. The one or more magnets may be provided on the protrusion or at other location(s) along the base 1283. In examples, the magnets may be positioned below the bottom surface of the guide. In some examples, the magnets may be substantially flush with the bottom surface of the guide. A coating or protective layer may be provided on the contact surface of the magnets to prevent the guide from scratching any exterior/aesthetic surfaces of the eyewear as may otherwise result from slidable engagement between the camera guide and the eyewear guide.

The camera 1200' may include one or more user controls 1294. The user controls 1294 may be implemented in the form of buttons, switches, or the like. To maintain waterproof characteristics of the camera, in some examples, such buttons or switches may be provided below a flexible portion of the housing. That is, one or more portions of the housing 1280 may be formed of a resilient material such as rubber, silicon, or the like, such that that portion of the housing may be deflected to operate a button located below the flexible portion. In some examples, the user controls 1294 may be implemented using one or more capacitive surfaces. For example, a capacitive switch 1295, which may include a smooth or textured surface, may be provided along a sidewall of the camera. The capacitive surface may be molded with the housing to provide an integral, water-tight user control. The capacitive switch 1295 may function as a trigger for capturing an image. In some examples, the same user control (e.g., capacitive switch 1295) may be configured to perform different functions depending on the manipulation of the user control. For example, a single input via the user control (e.g., single touch or click) may correspond with one function (e.g., capture an image), a double input (e.g., two consecutive touches or double clicks) may correspond with another function (e.g., initiate image transfer), a continuous input (e.g., a touch/click and hold) may correspond with yet another function (e.g., configuring a setting or a parameter of the camera, powering the camera on or off). These specific examples of functions or types of manipulations of the user control are illustrative only and other combinations of functions and/or manipulations of the user control(s) may be used.

User controls may be provided along one or more sides of the housing, for example along the sidewall, as shown in FIG. 12 or along a back wall 1289', as shown in FIG. 13. The camera may also include one or more securing features 1297. The camera may be configured to engage a securing ring which may be connected to the eyewear. The securing ring may be configured to provide an additional attachment means for ensuring that the camera remains connected to the eyewear even if the magnetic attachment fails. The securing ring may be made from a clear plastic material (e.g., clear rubber or silicon) and may have a diameter of the core ranging between 0.01 mm to about 2 mm. The camera may include a securing feature 1297 which may be in the form of a securing pin, as shown in FIG. 12 or a securing aperture, as shown in FIG. 13 for engaging the securing ring. In the example in FIG. 13, the securing aperture may be arranged such that a plane of a diameter of the aperture is generally perpendicular to the back wall 1289' and/or base of the camera. In some examples, the plane of the diameter of the aperture may be generally parallel with the longitudinal direction of the guide 1290.

The camera may include one or more indicators 1296. The indicators 1296 may be provided along one or more sides of the camera 1200', 1200", for example along a top side of the camera, as in the example in FIG. 12 or on the back wall 1289' of the camera, as in FIG. 13. The indicators may be implemented in the form of one or more white or colored LEDs, which based on a color, duration or pattern of illumination may provide indication as to different functions or states of the camera or components thereof. The indicators may include a charge status indicator, a power On/Off indicator, a privacy indicator, or others. For example, a privacy indicator may comprise one or more LEDs which may illuminate when an image (e.g., a still image or video) is being captured. The illumination may notify others that an image is being captured. In some examples, audible, vibrational, or other tactile feedback may be used for the one or more indicators. In some examples, the camera may be configured to provide audible feedback sounds to the user. For example, the camera may include a vibration source, a speaker, a buzzer, or other audio generating device and the indication may be provided by tactile or audible means.

In some examples, the camera may be devoid of a view finder. Commercially available cameras typically include a view finder, which in the case of digital cameras is typically in the form of a display. The view finder allows the user to visualize the image that will be captured by the image sensor thereby giving the user an opportunity to adjust the direction in which the camera is pointing so as to capture the desired image. A view finder however significantly increases the overall size of the camera because an additional display device has to be added in the case of digital camera to provide a view finder. Such a size increase may be undesirable or impractical in some examples, such as for a wearable or other small or miniaturized form factor cameras according to the present disclosure. In some examples, the camera does not include a view finder and the user may not be able to preview the image to be captured prior to capturing it. Configuration parameters for auto-alignment and/or auto-centering of images captured by a camera of the present disclosure may be developed in accordance with further examples herein.

Figure 14:
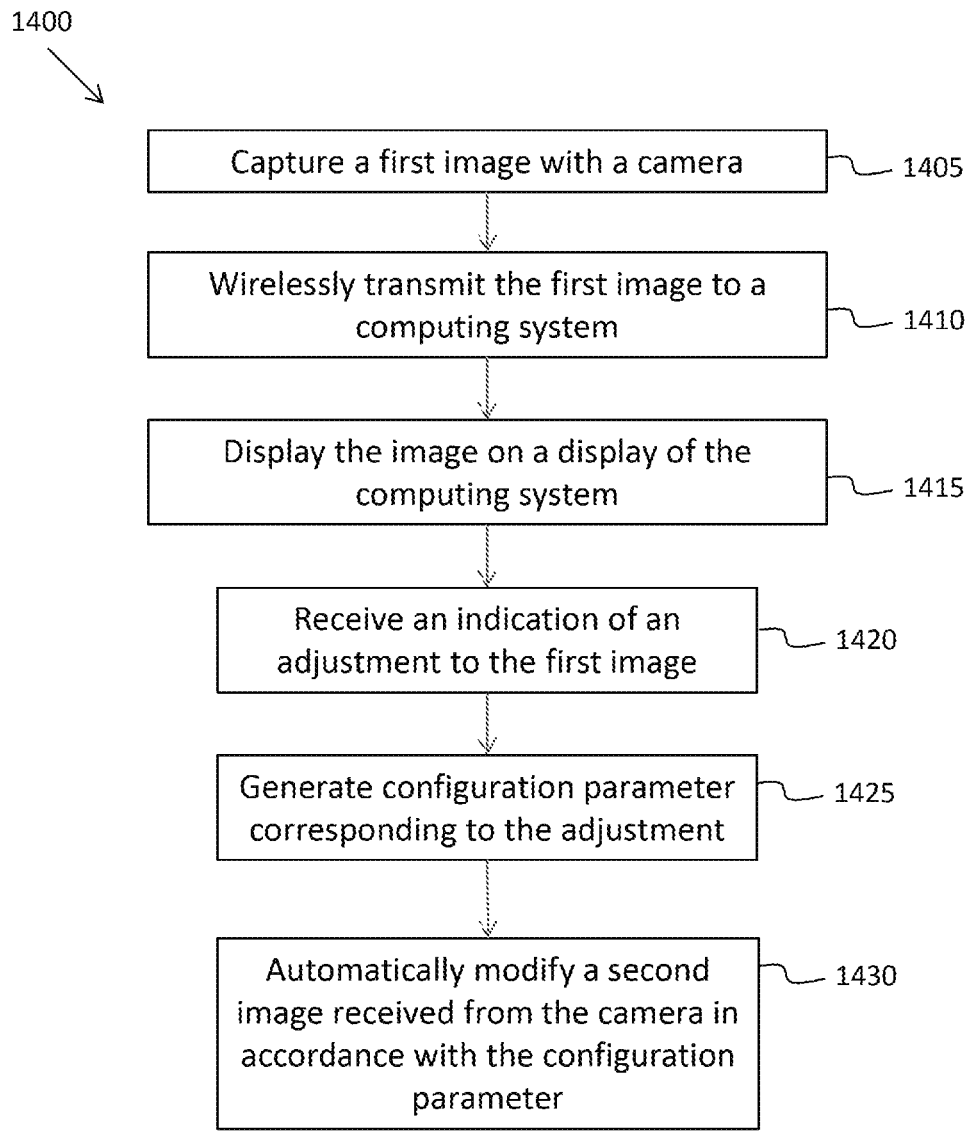
FIG. 14 illustrates a flow diagram of a process for automatic processing of an image captured by a camera in accordance with some examples herein.
Figure 15:
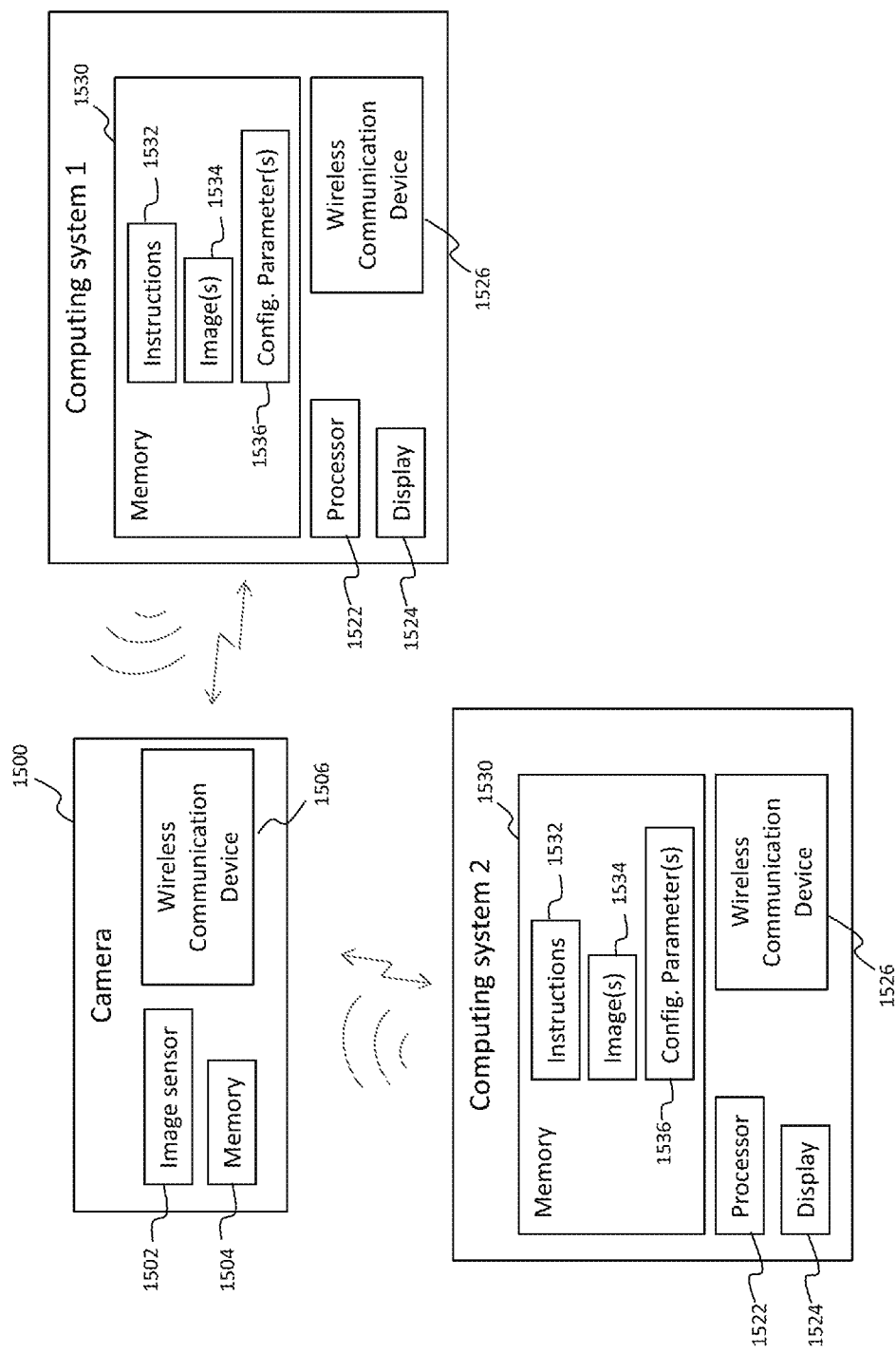
FIG. 15 illustrates a system for automatic processing of images in accordance some examples herein.

An example system and process for automatic processing of an image is described further with reference to FIGS. 14 and 15. As shown in blocks 1405 and 1410 of FIG. 14, a process 1400 may include the steps of capturing a first image with a camera (e.g., camera 1500 in FIG. 15), and wirelessly transmitting the first image to a computing system (e.g., computing system 1 in FIG. 15). The camera 1500 may include an image sensor 1502 and, a memory 1504. The camera 1500 may be configured to receive power wirelessly in accordance with the examples herein. In this regard, the camera 1500 may include some or all of the components of cameras described herein (e.g., camera 1200, 1200', 1200") thus for brevity the description of these components will not be repeated. The camera 1500 may be configured to communicate wirelessly with one or more computing systems. The camera 1500 may include a wireless communication device 1506, such as a Wi-Fi enabled or Bluetooth enabled receiver/transmitter or a receiver/transmitter configured additionally for wireless power reception, as described herein. In some examples, the camera may be devoid of a view finder thus the captured first image may not have been previewed prior to capture.

The computing system may be a personal computer, laptop, or a smart device such as a tablet or a mobile phone. The computing system (e.g., computing system 1) may include a memory 1530, a processor 1522, a display 1524, and a wireless communication device 1526 (e.g., Wi-Fi enabled or Bluetooth enabled receiver/transmitter and/or a receiver transmitter configured to also broadcast wireless power and/or receive data). In some examples, the computing system 1 may be the base unit or a communication device to which the base unit is attached. The memory may be configured to store processor-executable instructions, data (e.g., images 1534 received from the camera), and one or more configuration parameters 1536 associated with the camera.

The first image captured by camera 1500 may be used as a set-up or reference image. The first image may be displayed on a display of the computing system (e.g., display 1524 of computing system 1), as shown in block 1415 of FIG. 14. The user may modify the first image, for example by changing the center of the image, or changing an orientation of the image. This user-directed modification to the first image may be received by the computing system as an indication of an adjustment to the location of the center of the first image or the orientation of the first image, as shown in block 1420. The computing system may generate configuration parameters 1536 corresponding to the adjustment, as shown in block 1425 and store the configuration parameters 1536 in memory (e.g., memory 1530). This may complete a configuration or set-up process. In subsequent steps, the user may capture additional images with the camera (e.g., camera 1500). The images may be transmitted to the computing system (e.g., computing system 1) for processing (e.g., batch processing). The computing system may retrieve the configuration parameter 1536 following receipt of a second image from the camera and may automatically modify the second image in accordance with the configuration parameters 1536, as shown in block 1430 in FIG. 14. For example, the computing system may automatically center or rotate the image by a corresponding amount as in the first image. This modification may be performed automatically (e.g., without further user input) and/or in batch upon receiving additional images from the camera, which may reduce subsequent processing steps that the user may need to perform to the images. In some examples, initial modification (e.g., as directed by user input) may include cropping the image, which may be reflected in the configuration parameter. Thus, in some examples, automatic modification of subsequent images may also include cropping a second image based on the configuration parameters 1536. In some examples, the camera may be operable to be communicatively coupled to two or more computing systems. For example, the camera may be configured to receive power and data from and/or transfer data to a second computing system (e.g., computing system 2). The second computing system may be a personal computer, laptop, a smart device. In some examples, the second computing system may be a base unit of a wireless power transfer system or a communication device to which such base unit is coupled. In some examples, the first computing system may be configured to transmit (e.g., wirelessly) the configuration parameters 1536 to the camera. The configuration parameters 1536 may be stored in memory onboard the camera (e.g., memory 1504) and may be transmitted to other computing devices different from the initial computing device which generated the configuration parameters. The configuration parameters 1536 may be transmitted to these other computing devices for example prior to or along with images transferred thereto, which may enable automatic processing/modification of images by additional computing device other than the computing device used in the initial set-up process. It will be appreciated that the designation of computing system as first or second is provided for clarity of illustrations and in examples, the set-up/configuration steps may be performed by the second computing system. It will be further understood that while two computing systems are illustrated in FIG. 15, embodiments according to the present disclosure may include any number of computing systems.

In some examples, a process for auto-centering of an image may include the steps of capturing an image with a camera (e.g., camera 1500). The camera may be devoid of a view finder. The camera 1500 may wirelessly transmit the image to a computing system (e.g., computing system 1 or computing system 2). The computing system may include processor-executable instructions (e.g., instructions 1532) for processing the image, for example for auto-centering the image based on a number of objects in the image. For example, the computing system may include processor-executable instructions for identifying number of objects in the image. In some examples, the objects may be one or more heads, which may be human heads, or other objects such as buildings, or other natural or man-made structures. Following identification of the number of objects, the computing system may determine a middle object from the number of objects. For example, if the computing system determines that there are 5 heads in the image, the middle head, which may be the $3^{rd}$ head, may be selected as the middle head, if the computing system determines that there are 7 heads, the $4^{th}$ head may be determined as the middle head, and so on. In some examples, the computing system may include instructions for centering the image between two adjacent object. For example, if an even number of objects are identified, the computing system may be configured to split the difference between the middle two adjacent object and center the image there. In some examples, the computing system may refer to a look-up table which may identify the middle object(s) for any given number of objects. The computing system may then automatically center the image on the middle object or a midpoint between two adjacent middle objects. In other words, the computing system may be configured to count the number of heads in the captured image and center the captured image on the middle head or the midpoint between two adjacent middle objects. The computing system may store the modified image centered in accordance with the examples herein.

The above detailed description of examples is not intended to be exhaustive or to limit the method and system for wireless power transfer to the precise form disclosed above. While specific embodiments of, and examples for, the method and systems for wireless power transfer are described above for illustrative purposes, various equivalent modifications are possible within the scope of the system, as those skilled in the art will recognize. For example, while processes or blocks are presented in a given order, alternative embodiments may perform routines having operations, or employ systems having blocks, in a different order, and some processes or blocks may be deleted, moved, added, subdivided, combined, and/or modified. While processes or blocks are at times shown as being performed in series, these processes or blocks may instead be performed in parallel, or may be performed at different times. It will be further appreciated that one or more components of base units, electronic devices, or systems in accordance with specific examples may be used in combination with any of the components of base units, electronic devices, or systems of any of the examples described herein.

What is claimed is:
1. A camera comprising:
an image capture device;
a receiver configured to receive power wirelessly from a
  distance separated transmitting coil of a wireless power transfer system which includes a base unit, wherein the receiver comprises a receiving coil having a magnetic core;

a rechargeable battery coupled to the receiver for storing wirelessly received power;

a memory configured to store images captured with the image capture device; and wherein the camera is configured to transfer data including one or more images captured with the image capture device to another computing device;

wherein the camera comprises an aperture for engaging with a securing ring, and wherein the camera further comprises a guide configured to engage a temple guide of an eyewear frame, and wherein the aperture is in a plane which is parallel with a longitudinal direction of the guide.

2. The camera of claim 1, wherein the receiving coil is configured to receive power from the transmitting coil regardless of orientation between the receiving and transmitting coils.

3. The camera of claim 1, wherein the magnetic core comprises a ferrite core.

4. The camera of claim 1, wherein the camera is a wearable camera.

5. The camera of claim 1, wherein the camera is waterproof.

6. The camera of claim 1, wherein the another computing device is the base unit.

7. The camera of claim 1, further comprising a transmitter configured to transmit one or more of the images stored in the memory to the wireless power transfer system.

8. The camera of claim 1 further configured to broadcast a proximity signal for detecting the wireless power receiver in proximity.

9. The camera of claim 1, wherein the housing includes a first opening and an optically transparent material spanning the first opening, and wherein the housing further includes a second opening and an acoustically transparent material spanning the second opening.

10. The camera of claim 1 further comprising at least one user control for receiving user input.

11. The camera of claim 1, wherein the at least one user control comprises a capacitive switch.

12. The camera of claim 1 further comprising a status indicator, a privacy indicator, or combinations thereof.

13. The camera of claim 1, wherein the camera is devoid of a view finder.

14. The camera of claim 1, further comprising a processor, and wherein at least the image capture device, the receiving coil, the processor, and the memory are enclosed in a housing configured to be movably coupled to a wearable article.

15. The camera of claim 14, wherein the housing includes a guide comprising one or more magnets for magnetically attaching the wearable camera to eyewear.

16. The camera of claim 1 further comprising a microphone.

17. The camera of claim 16, wherein the camera is configured to detect an audible command and capture an image responsive to the audible command.

18. The camera of claim 1, further comprising the securing ring, wherein the securing ring is made of a plastic material.

19. The camera of claim 18, wherein the plastic material is an elastic material or a stretchable plastic material.

20. The camera of claim 1, further comprising the securing ring, wherein the securing ring comprises a core diameter greater than 0.01 mm and less than 2 mm.

21. The camera of claim 20, wherein the core diameter is less than 1 mm.

22. A system comprising:

a base unit comprising a transmitter configured for wireless power delivery and a battery coupled to the transmitter, wherein the transmitter comprises a transmitting coil having a magnetic core; and a wearable camera separated from the base unit, the wearable camera comprising a receiver inductively coupled to the transmitter to receive power from the base unit while the wearable camera remains within a charging distance from the base unit, wherein the receiver comprises a receiving coil having a magnetic core, wherein a dimension of the transmitting coil is at least twice a dimension of the receiving coil, wherein the wearable camera comprises an aperture for engaging with a securing ring, and wherein the wearable camera further comprises a guide configured to engage a temple guide of an eyewear frame, and wherein the aperture is in a plane which is parallel with a longitudinal direction of the guide.

23. The system of claim 22, wherein:

the dimension of the transmitting coil is a diameter of the transmitting coil, a length or a diameter of a wire forming windings of the transmitting coil, a number of windings of the transmitting coil, or a length, a diameter or a surface area of the core of the transmitting coil; and the dimension of the receiving coil is respectively a diameter of the receiving coil, a length or a diameter of a wire forming windings of the receiving coil, a number of windings of the receiving coil, or a length, a diameter or a surface area of the core of the receiving coil.

24. The system of claim 22, wherein the transmitter and receiver are configured for operation with a Q value less than 100.

25. The system of claim 22, wherein the transmitter and receiver are configured to operate at a frequency within the range of 50 kHz or 500 kHz, wherein the transmitter and receiver are configured to operate in weak resonance, and wherein the system is configured to operate using an amount of guided flux.

26. The system of claim 22, wherein the base unit is configured to be mechanically coupled to a portable communication device.

27. The system of claim 22, wherein the transmitter comprises an omnidirectional antenna configured to transmit power to one or more electronic devices including the wearable camera regardless of orientation of the electronic devices with respect to the base unit.

28. The system of claim 22, wherein the wearable camera is configured to be magnetically attached to the eyewear frame.

29. A method comprising:

placing a base unit proximate a wearable camera, the base unit comprising a transmitting coil configured to inductively couple with a receiving coil in the wearable camera to wirelessly transmit power to the wearable camera, wherein the transmitting coil and the receiving coil, each comprise a magnetic core, and wherein the wearable camera comprises an aperture for engaging with a securing ring, and wherein the wearable camera further comprises a guide configured to engage a temple guide of an eyewear frame, and wherein the aperture is in a plane which is parallel with a longitudinal direction of the guide;

detecting the wearable camera with the base unit; and wirelessly transmitting power from the base unit to the wearable camera while the electronic device remains within a charging range of the base unit or until a charge state signal of the wearable camera corresponds to a fully charged state of the wearable camera.

30. The method of claim 29 further comprising capturing an image responsive to an audible command detected by the wearable camera.

31. The method of claim 29 further comprising wirelessly transmitting an image captured by the camera to the base unit.

32. The method of claim 29, wherein the detecting the wearable camera comprises automatically detecting a signal from the wearable camera, the signal broadcast by the wearable camera or transmitted to the base unit responsive to an interrogation signal from the base unit.

33. The method of claim 29, wherein wirelessly transmitting power from the base unit comprises broadcasting power signals at a body-safe level.

34. The method of claim 29, wherein wirelessly transmitting power from the base unit comprises broadcasting power signals at a frequency within the range of 50 kHz or 500 kHz.

35. A camera comprising an image sensor, a battery, and a memory, wherein the camera is devoid of a view finder and wherein the camera is configured to be attachable to and detachable from eyewear, the camera further comprising a safety feature for preventing loss of the camera in the event of accidental detachment of the camera from the eyewear, wherein the camera comprises an aperture for engaging with a securing ring, and wherein the camera comprises a guide configured to engage a temple guide of the eyewear, and wherein the aperture is in a plane which is parallel with a longitudinal direction of the guide.

36. The camera of claim 35, wherein the battery is a rechargeable battery, the camera further comprising a receiver operatively coupled to the battery and configured to receive power signals wirelessly for charging the battery.

37. The camera of claim 35, further comprising the securing ring, and wherein a diameter of a core of the securing ring is 1 mm or less.

38. The camera of claim 35, further comprising the securing ring, wherein the securing ring is made of a plastic material.

39. The camera of claim 38, wherein the plastic material is an elastic material or a stretchable plastic material.

40. The camera of claim 35, further comprising the securing ring, wherein the securing ring comprises a core diameter greater than 0.01 mm and less than 2 mm.

41. The camera of claim 40, wherein the core diameter is less than 1 mm.

42. A method comprising:

capturing a first image with a camera;

transmitting the first image to a computing system;

displaying the first image on a display of the computing system;

receiving an indication of an adjustment to a location of a center of the first image or an orientation of the first image;

generating a configuration parameter corresponding to the adjustment to the location of the center of the first image or the orientation of the first image;

storing the configuration parameter in memory of the computing device;

retrieving the configuration parameter following receipt of a second image from the camera; and automatically adjusting the second image in accordance with the configuration parameter.

43. The method of claim 42, wherein automatically modifying the second image includes automatically cropping the second image based on the configuration parameter.

44. The method of claim 42, wherein capturing the first image includes capturing the first image with a camera devoid of a view finder.

45. The method of claim 42, wherein the first image is transmitted wirelessly from the camera to the computing system.

46. The method of claim 42, wherein automatically modifying the second image includes automatically rotating the second image based on the configuration parameter.

47. A method comprising:

capturing an image with a camera devoid of a view finder;

transmitting the image to a computing system;

identifying, using the computing system, a number of objects in the image;

determining a middle object from the number of objects;

automatically centering the image on the middle object to generate a modified image; and storing the modified image.

48. The method of claim 47, wherein the objects are human heads.

49. The method of claim 47, wherein the image is transmitted wirelessly from the camera to the computing system.

* * * * *